(12) United States Patent
Hedman et al.

(10) Patent No.: US 11,891,023 B1
(45) Date of Patent: *Feb. 6, 2024

(54) USING CAMERA DATA TO MANAGE A VEHICLE PARKED OUTSIDE IN COLD CLIMATES

(71) Applicant: Ambarella International LP, Santa Clara, CA (US)

(72) Inventors: Greg Hedman, San Jose, CA (US); Shimon Pertsel, Mountain View, CA (US)

(73) Assignee: Ambarella International LP, Santa Clara, CA (US)

( * ) Notice: Subject to any disclaimer, the term of this patent is extended or adjusted under 35 U.S.C. 154(b) by 494 days.

This patent is subject to a terminal disclaimer.

(21) Appl. No.: 17/206,233

(22) Filed: Mar. 19, 2021

Related U.S. Application Data

(63) Continuation of application No. 16/288,922, filed on Feb. 28, 2019, now Pat. No. 11,001,231.

(51) Int. Cl.
| | |
|---|---|
| *B60S 1/08* | (2006.01) |
| *G06T 7/00* | (2017.01) |
| *G05D 1/02* | (2020.01) |
| *B60R 16/033* | (2006.01) |
| *B60H 1/00* | (2006.01) |
| *G06N 3/02* | (2006.01) |
| *B60S 1/02* | (2006.01) |
| *B60S 1/46* | (2006.01) |
| *G06V 20/56* | (2022.01) |

(52) U.S. Cl.
CPC ........ *B60S 1/0844* (2013.01); *B60H 1/00735* (2013.01); *B60R 16/033* (2013.01); *B60S 1/023* (2013.01); *B60S 1/46* (2013.01); *G05D 1/0291* (2013.01); *G06N 3/02* (2013.01); *G06T 7/0002* (2013.01); *G06V 20/56* (2022.01); *G06T 2207/10016* (2013.01); *G06T 2207/30192* (2013.01); *G06T 2207/30252* (2013.01); *G06V 2201/10* (2022.01)

(58) Field of Classification Search
CPC .......... B60S 1/0844; B60S 1/023; B60S 1/46; G06V 20/56; G06V 2201/10; B60H 1/00735; B60R 16/033; G05D 1/0291; G06N 3/02; G06T 7/0002; G06T 2207/10016; G06T 2207/30192; G06T 2207/30252
See application file for complete search history.

(56) References Cited

U.S. PATENT DOCUMENTS 11,001,231 B1 * 5/2021 Hedman ............... B60S 1/0844

\* cited by examiner

*Primary Examiner* — Tyler J Lee
*Assistant Examiner* — Yufeng Zhang
(74) *Attorney, Agent, or Firm* — Christopher P. Maiorana, PC

(57) ABSTRACT

An apparatus includes an interface and a processor. The interface may be configured to receive video frames comprising at least one of a vehicle or an outdoor environment near the vehicle and a correction signal. The processor may be configured to perform video operations on the video frames to detect objects, predict a state of the vehicle based on the objects detected in the video frames and generate the correction signal. The correction signal may be configured to apply a corrective measure based on the predicted state of the vehicle. The state of the vehicle may be predicted when the vehicle is parked in the outdoor environment. The state of the vehicle may comprise factors that prevent driving the vehicle.

20 Claims, 15 Drawing Sheets

USING CAMERA DATA TO MANAGE A VEHICLE PARKED OUTSIDE IN COLD CLIMATES

This application relates to U.S. application Ser. No. 16/288,922, filed on Feb. 28, 2019, which is hereby incorporated by reference in its entirety.

FIELD OF THE INVENTION

The invention relates to vehicle management generally and, more particularly, to a method and/or apparatus for implementing using camera data to manage a vehicle parked outside in cold climates.

BACKGROUND

When a vehicle is parked outside in cold climates, the vehicle may not be drivable due to a number of factors. Snow build-up on top of the hood can obstruct the windshield, a frozen windshield can impair visibility, windows or outside mirrors, door handles/locks can be frozen, etc. Drivers often spend a lot of time getting the car into a drivable condition (i.e., scraping windows, chipping away ice, turning on the heat, brushing snow away, etc.).

Some people park the car in a garage or under some type of cover to avoid exposing the vehicle to the elements. However, finding cover is not always possible. If the weather is known in advance, the extra preparation time to clear away the cold weather elements causes people to wake up earlier and spend time preparing the vehicle. In cases of unexpected snowfall, the extra preparation time can result in arriving late and missing meetings, etc.

It would be desirable to implement using camera data to manage a vehicle parked outside in cold climates.

SUMMARY

The invention concerns an apparatus comprising an interface and a processor. The interface may be configured to receive video frames comprising at least one of a vehicle or an outdoor environment near the vehicle and a correction signal. The processor may be configured to perform video operations on the video frames to detect objects, predict a state of the vehicle based on the objects detected in the video frames and generate the correction signal. The correction signal may be configured to apply a corrective measure based on the predicted state of the vehicle. The state of the vehicle may be predicted when the vehicle is parked in the outdoor environment. The state of the vehicle may comprise factors that prevent driving the vehicle.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing using camera data to manage a vehicle parked outside in cold climates that may (i) integrate vehicle cameras, connectivity to weather data, and vehicle sensors, (ii) connect with a user calendar to schedule vehicle preparation, (iii) monitor the state of a vehicle and vehicle surroundings, (iv) predict weather issues, (v) apply corrective measures in response to predicted weather issues, (vi) balance energy conservation with vehicle preparation, (vii) predict effectiveness of corrective measures and/or (viii) be implemented as one or more integrated circuits.

Embodiments of the invention may take advantage of several changes in the technological landscape. One technological change may be the advent of electric cars. Electrical vehicles enable a large source of energy (e.g., a main car battery and/or several batteries provide several kWh of energy). Embodiments of the invention may utilize the large source of energy when the vehicle is parked. Embodiments of the invention may implement vehicle cameras configured to monitor the weather, status of windshield, as well as snow build-up. Another technological change may be vehicle connectivity. Embodiments of the invention may utilize vehicle connectivity to access external weather information, as well as communicating with a driver to provide an alert.

Embodiments of the invention may implement an integrated approach to preparing a vehicle for driving in cold environments. Using car cameras to analyze the outside environment, connectivity for weather data, temperature sensor in the vehicle as well as calendar data, the invention may prepare the vehicle for the driver by the time the driver is expected to leave. In cold climates and when a vehicle is parked outside, the invention may perform corrective measures so that the vehicle is ready for driving (e.g., remove snow build-up on top of the hood so the windshield is not obstructed, de-frost frozen windshields, windows and mirrors so that visibility is not impaired, unfreeze doors and/or door handles to enable access to the vehicle, etc.). Implementing the invention may prepare the vehicle so that the driver does not have to wake up early and/or spend time preparing the vehicle (e.g., cleaning the vehicle from the outside, heating, etc.).

Figure 1:
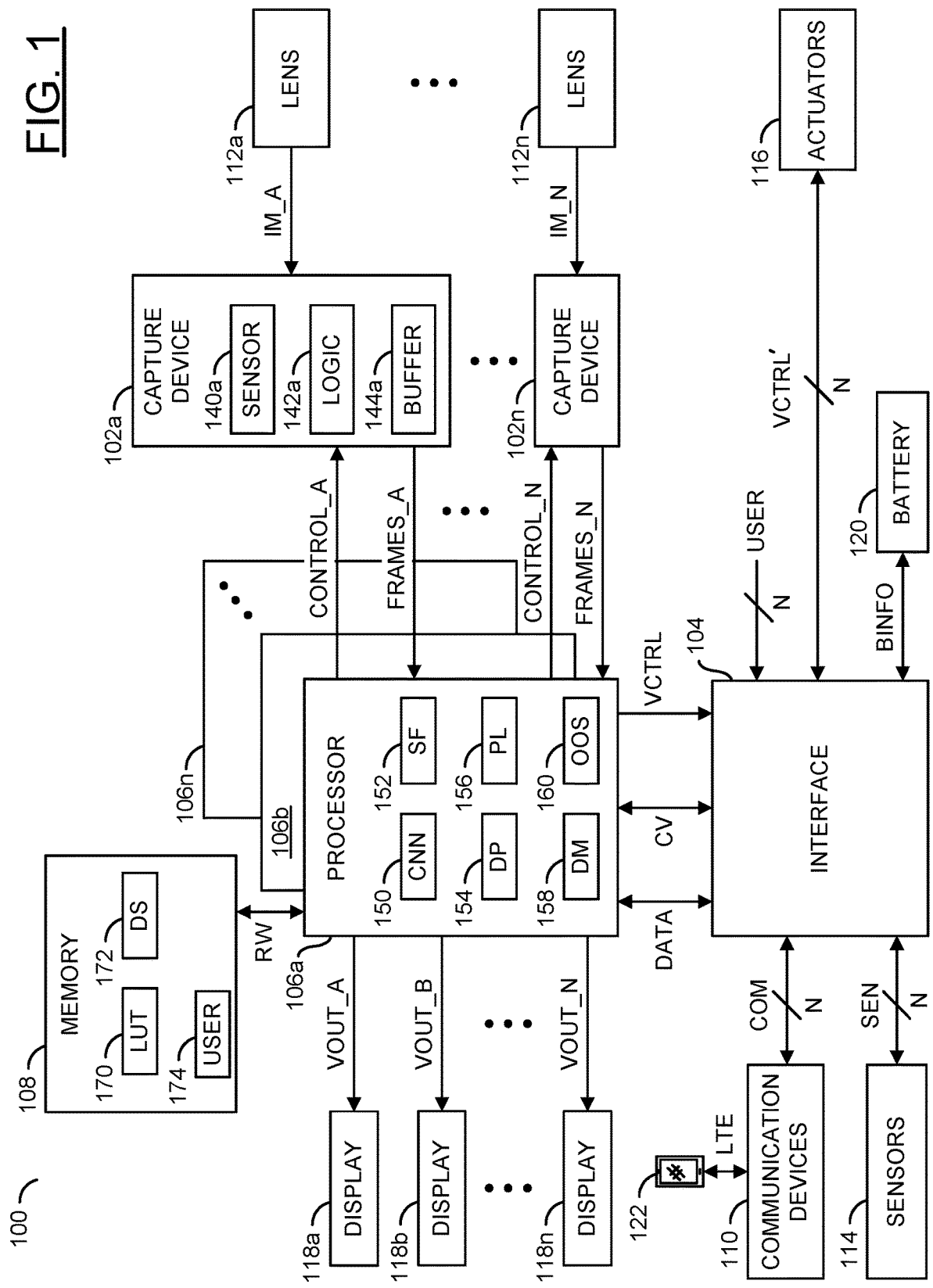
FIG. 1 is a diagram illustrating an embodiment of the present invention.

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116, blocks (or circuit) 118a-118n, a block (or circuit) 120 and/or a block (or circuit) 122. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The circuit 120 may implement an energy source and/or a power supply (e.g., a car battery). The circuit 122 may implement an external user device (e.g., a smartphone). The apparatus 100 may comprise other components (not shown). The number, type and/or arrangement of the components of the apparatus 100 may be varied according to the design criteria of a particular implementation.

In various embodiments of the apparatus 100, the components 102a-122 may be implemented as a distributed camera system 100. In the distributed system embodiment of the apparatus 100, each component may be implemented separately throughout an installation location (e.g., such as a vehicle). In some embodiments of the apparatus 100, the components 102a-122 may be implemented on a printed circuit board (e.g., a single module). In the single module embodiment, each component may be connected to a single module (e.g., such as a circuit board on a small device such as a drone). In some embodiments, some of the components 102a-122 may be implemented on a single module and some of the components 102a-122 may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-122 may be components separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-120 may be implemented as part of another one of the components 102a-120. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to receive a respective one of the signals IM_A-IM_N, a respective signal (e.g., CONTROL_A-CONTROL_N) and/or present a respective signal (e.g., FRAMES_A-FRAMES_N).

The capture devices 102a-102n may each be configured to generate images and/or video frames in response to the signals IM_A-IM_N (e.g., perform an analog to digital conversion). The capture devices 102a-102n may capture data received through the lenses 112a-112n to generate video image data (e.g., generate video frames). The signals FRAMES_A-FRAMES_N may comprise video frames and/or images generated by the capture devices 102a-102n (e.g., video data). In some embodiments, the capture devices 102a-102n may be configured to perform depth sensing (e.g., the signals FRAMES_A-FRAMES_N may comprise depth information and/or vector light data in addition to the video frames). In one example, the capture devices 102a-102n may perform depth sensing using stereo cameras (e.g., cameras configured as a stereo pair to capture a depth map). In another example, the capture devices 102a-102n may perform depth sensing using time-of-flight. In yet another example, the capture devices 102a-102n may perform depth sensing using structured light. The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL'), a signal (e.g., USER) and/or a signal (e.g., BINFO). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The signal BINFO may represent data corresponding to a battery status (e.g., remaining energy, current draw, amount of time to recharge, etc.). The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example, the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signals VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The memory 108 may be configured to store computer readable/executable instructions (or firmware or code). The instructions, when executed by the processors 106a-106n, may perform a number of steps. The block 174 may implement user data storage (e.g., a schedule of a user, driver behavior, expected departure times, etc.). In some embodiments, the processors 106a-106n may be implemented as a system-on-chip (SoC) and the memory 108 may be a component of the processors 106a-106n. The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. The communication devices 110 may send and/or receive data to/from the user device 122. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The communication device 110 may receive a signal (e.g., LTE). The signal LTE may be received wirelessly. The signal LTE may provide information from external sources. In one example, the signal LTE may provide information from the user device 122 (e.g., a smartphone may provide a calendar/schedule of a user, a smartphone may provide weather information). In another example, the signal LTE may provide information from a server and/or the internet.

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a LIDAR device, an array of LIDAR devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, etc. The actuators 116 may control various components of the host vehicle. The number, type and/or functionality of the actuators 116 may be varied according to the design criteria of a particular implementation.

The displays 118a-118n may be each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the display 118a-118n. For example, the processor 106a-106n may provide real-time video streaming to the displays 118a-118n via the signals VOUT_A-VOUT_N.

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The logic 142a may transform the bitstream into a human-legible content (e.g., video data and/or video frames). For example, the logic 142a may receive pure (e.g., raw) data from the camera sensor 140a and generate video data based on the raw data (e.g., the bitstream). The logic 142a may further control the lens 112a in response to the signal CONTROL_A. The memory buffer 144a may store the raw data and/or the processed bitstream. For example, the frame memory and/or buffer 144a may store (e.g., provide temporary storage and/or cache) one or more of the video frames (e.g., the video signal). In some embodiments, each of the capture devices 102a-102n may comprise other components (e.g., a battery, a motor, a microphone, etc.).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. Details of the computer vision implemented by the CNN module 150 may be described in association with FIG. 6.

The sensor fusion module 152 may be configured to analyze information from multiple sensors 114, capture devices 102a-102n, the battery 120 and/or the user data 174 for redundancy. By analyzing various data from disparate sources, the sensor fusion module 152 may be capable of making inferences about the data that may not be possible from one of the data sources alone. For example, the sensor fusion module 152 may analyze video data as well as radar, LIDAR, inertial, motion, V2X, location data (e.g., GPS, GNSS, ADAS, etc.), gaze direction, driver state, battery status, weather information, location information (e.g., if the location has protection from the elements, if the location is shady at a particular time of day, etc.), user schedule, and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by LIDAR for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

In a vehicle preparation example, the sensor fusion module 152 may determine the weather conditions outside of a vehicle. In an example, the sensor fusion module 152 may combine information determined based on the computer vision operations (e.g., detecting snowfall), information from the sensors 114 (e.g., a temperature reading below freezing) and/or weather information (e.g., information received from the user device 122 that provides weather reports for the area) to confirm a state of a vehicle. The sensor fusion module 152 may further combine future weather information with current weather information and a schedule of a driver to predict a state of a vehicle when a driver is expected to depart.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing, downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection and/or high dynamic range processing. The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signal VOUT_A-VOUT_N).

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification. In yet another example, the decision making module 158 may adjust output characteristics of the displays 118a-118n (e.g., brightness).

The decision making module 158 may be further configured to select which corrective measure to apply in response to factors that prevent a vehicle from being driven (e.g., windshield wipers, window de-frost, vehicle pre-heating, etc.). The decision making module 158 may determine when to apply the corrective measures to ensure that the vehicle is drivable when the driver is expected to depart.

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The user data storage 174 may comprise information about one or more users of a vehicle. In an example, different drivers may have different driving behaviors (e.g., one driver may accelerate more quickly, which increases the drain on the battery 120). In another example, each driver may have an expected departure time. Details of the user data storage 176 may be described in association with FIG. 10.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, blended, stitched and/or rolling shutter effect corrected versions of the signals FRAMES_A-FRAMES_N.

Figure 2:
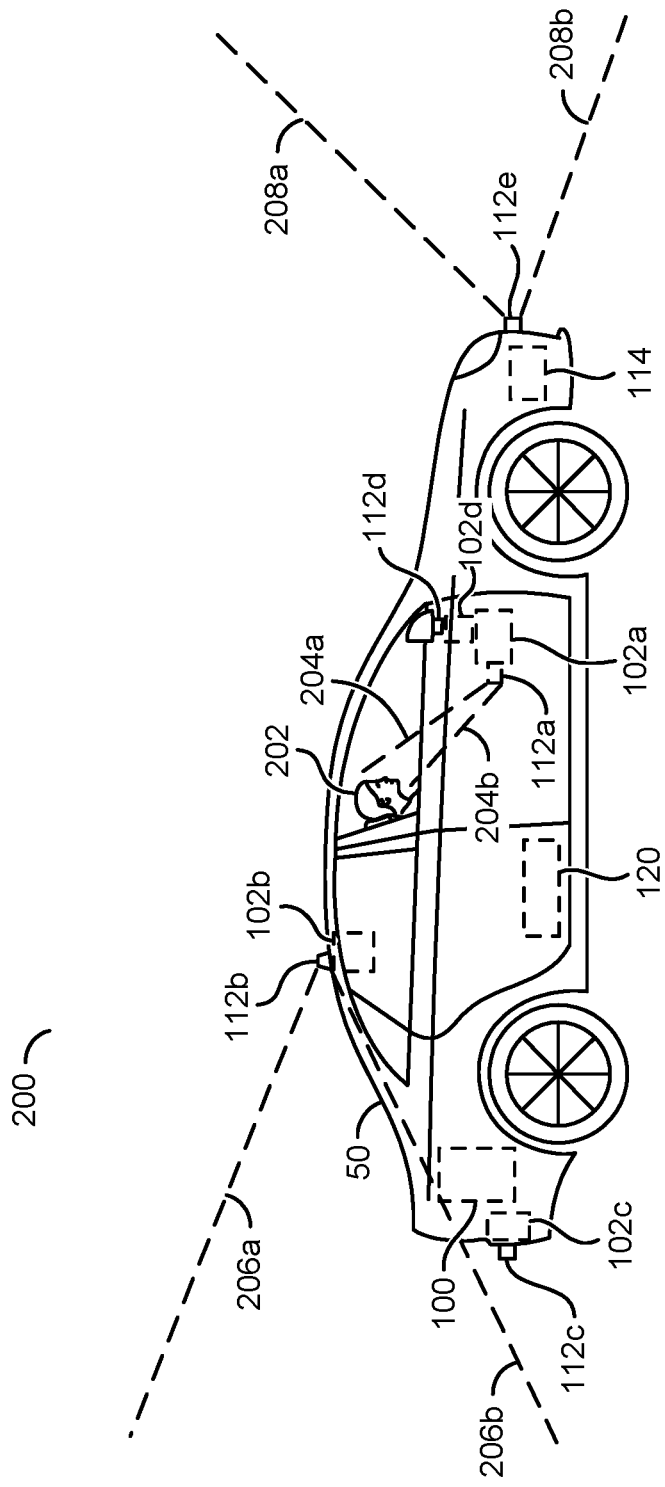
FIG. 2 is a diagram illustrating an example of camera systems inside and outside of a vehicle.

Referring to FIG. 2, an example embodiment 200 of camera systems inside and outside of a vehicle is shown. An automobile/vehicle 50 is shown. The apparatus 100 is shown as a component of the vehicle 50. In the example shown, the vehicle 50 is a car. In some embodiments, the vehicle 50 may be a truck, an ATV, an airplane, a drone, etc. The type of the vehicle 50 implementing the apparatus 100 may be varied according to the design criteria of a particular implementation.

A driver 202 is shown seated in the vehicle 50. The vehicle sensors 114 are shown on (or in) the vehicle 50. The battery 120 is shown in the vehicle 50. The apparatus 100 is shown in the rear of the vehicle 50. In another example, the apparatus 100 may be distributed throughout the vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the vehicle 50 (e.g., detecting the driver 202). A targeted view of the driver 202 (e.g., represented by a line 204a and a line 204b) is shown being captured by the capture device 102a. The capture device 102a may also detect other objects in the vehicle 50 (e.g., a seat, a head rest, an arm rest, a rear window, a seatbelt, a center console, other occupants, etc.). By analyzing video of the driver 202 and/or other occupants of the vehicle 50 (e.g., extracting video data from the captured video), the processors 106a-106n may determine a body position and/or body characteristics (e.g., a distance, orientation and/or location of the body and/or head) of one or more occupants of the vehicle 50 and/or objects within the vehicle 50.

In some embodiments, more than one of the capture devices 102a-102n may be used to capture video data of the driver 202 and/or other occupants of the vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112b and the capture device 102b) is shown capturing a targeted view from the vehicle 50. In the example shown, the targeted view from the vehicle 50 (e.g., represented by a line 206a and a line 206b) is shown capturing an exterior view to the rear of (e.g., an area behind) the vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b) may provide a front exterior view of an area. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the vehicle 50. The processors 106a-106n may implement computer vision to detect objects and/or understand what is happening near the vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a LIDAR device, an array of LIDAR devices, an ultra-sound device, an array of ultra-sound devices, etc.

The sensor fusion module 152 may aggregate data from the sensors 114, the battery 120, external information (e.g., weather information, location information, an expected departure time of the driver 202, the CNN module 150 and/or the video pipeline 156 to build a model and/or abstraction of the environment around the vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the vehicle 50 should stop, understand that a pedestrian is walking across the street from right to left, understand that brake lights of a vehicle ahead indicate that the vehicle is slowing down, understand that snow is accumulating on the vehicle 50 and will obstruct a view of the driver 202, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

Figure 3:
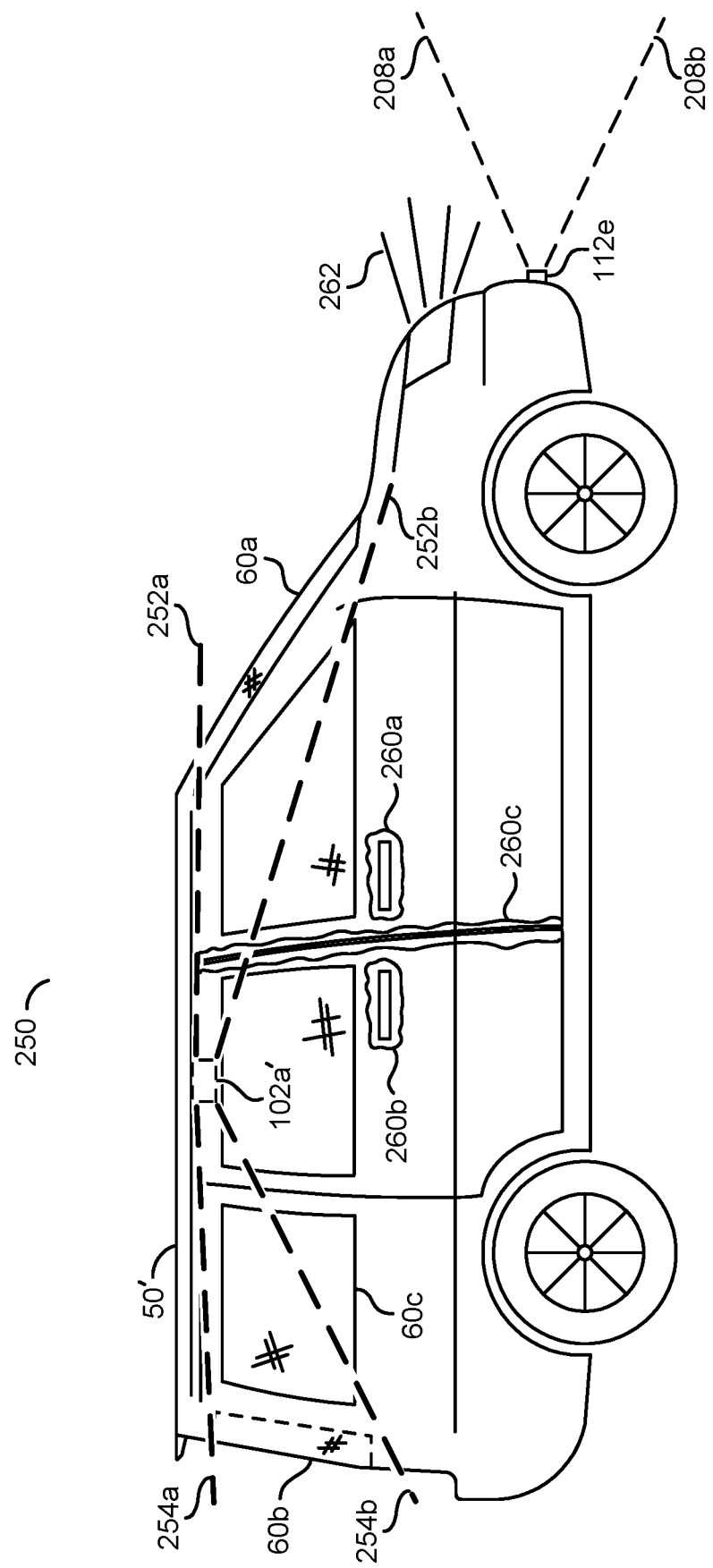
FIG. 3 is a diagram illustrating detecting vehicle issues on an exterior of a vehicle.

Referring to FIG. 3, a diagram illustrating detecting vehicle issues on an exterior 250 of the vehicle 50' is shown. The capture device 102a' is shown within the vehicle 50'. Multiple windows (e.g., a windshield 60a, a rear window 60b and a side window 60c) of the vehicle 50' are shown. Each of the windows 60a-60c may be monitored to detect and/or classify a state of the vehicle 50'.

The capture device 102a' is shown mounted on a ceiling of the vehicle 50'. The capture device 102a' is shown having an angle 252a and an angle 252b (e.g., a field of view) that points toward the front windshield 60a. The capture device 102a' may also have a field of view angle 254a-254b to capture the rear window 60b. In another example, the capture device 102a' may implement a wide angle lens to capture all windows of the vehicle 50'. The field of view from the angle 252a and the angle 252b may provide a targeted view of the interior of the vehicle 50'. The number of angles and/or fields of view may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver, other occupants, physical characteristics of people in the vehicle, facial expressions of people in the vehicle, fields of view of the people in the vehicle, physical characteristics of windows and mirrors of the vehicle 50', etc.). The processors 106a-106n may be configured to determine an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person. For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an amount of precipitation. In another example, tracking a static object across video frames temporally may be implemented to determine a status of an object. For example, the windshield 60a may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the vehicle 50' to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the vehicle 50'. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a temperature sensor to confirm that the environment is cold enough for frost to form, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114. The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The memory 108 may store the pre-determined locations and/or a pre-determined field of view of each of the capture devices 102a-102n. The memory 108 may store reference data corresponding to the objects. For example, the memory 108 may store reference color histograms about various known types of objects (e.g., frost, snow, etc.). In another example, the memory 108 may store previously captured frames (e.g., a reference image from when the vehicle 50' was parked, when the vehicle 50' came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the vehicle 50'. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to the display 118 (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

Factors 260a-260c are shown on the vehicle 50'. The factors 260a-260c may be a condition that may potentially prevent the vehicle 50' from being driven and/or accessed. In the example shown, the factors 260a-260c may be frost and/or ice. The ice 260a is shown formed around a door handle of the front door of the vehicle 50'. The ice 260b is shown formed around a door handle of the side door of the vehicle 50'. The ice 260a-260b may prevent a user from opening the doors and gaining entry into the vehicle 50'. The ice 260c is shown between the front and side door of the vehicle 50'. Similarly, the ice 260' may prevent opening the doors to the vehicle 50'.

The factors 260a-260c may represent factors that may not be visible, but may be inferred. For example, one of the capture devices 102a-102n may not be directed at the doors of the vehicle 50' (e.g., the doors may possibly be visible if a camera is mounted where side view mirrors are located to provide a side view for an electronic mirror). The factors 260a-260c may be inferred by the decision module 158 based on analysis by the sensor fusion module 152. For example, the sensors 114 may detect a low temperature, the capture devices 102a-102n may detect frost on the windshield 60a and/or snowfall and/or the external weather information from the signal LTE may indicate that freezing temperatures are expected overnight. Based on the information from the sensor fusion module 152, the decision module 158 may infer that the ice 260a-260c may form on the doors.

A factor 262 is shown. The factor 262 may be a condition that may potentially prevent the vehicle 50' from being driven and/or accessed. In the example shown, the factor 262 may be an amount of illumination emitted by the vehicle headlights. For example, insufficient illumination may prevent the vehicle 50' from being driven safely. The factor 262 may represent a factor that may be visible. For example, the amount of illumination 262 may be detected in the field of view 208a-208b of the lens 112e. The processors 106a-106n may perform the computer vision operations to detect whether sufficient illumination is provided by the vehicle headlights (e.g., visibility distance).

The processors 106a-106n may be configured to select corrective measures based on a detected and/or predicted state of the vehicle 50'. For example, based on the ice factors 260a-260c and/or the illumination factor 262, the decision module 158 may determine that the vehicle 50' is not in a drivable state (e.g., inaccessible and/or unable to provide enough light for driving). The processors 106a-106n may select one or more corrective measures to change the state of the vehicle 50' (e.g., react to the factors 260a-260c and/or the factor 262). In one example, the corrective measure may be pre-heating the vehicle 50' (e.g., heating the vehicle 50' before the departure time of the driver 202). Pre-heating the vehicle 50' may melt the ice 260a-260c and/or de-frost the vehicle headlights to increase the illumination 262.

The processors 106a-106n may analyze the video data and/or the other factors (e.g., weather, the sensors 114, etc.) while the vehicle 50' is parked. In some embodiments, the corrective measures selected by the processors 106a-106n may be applied based on the expected departure time of the driver 202. For example, the decision module 158 may determine that, based on the weather (e.g., current temperature and future temperature), the factors 260a-260c and/or 262 (e.g., the amount of ice build-up) and/or the heating capabilities of the components of the vehicle 50', that the corrective measure (e.g., pre-heating the vehicle 50') may take a particular amount of time to change the state of the vehicle 50' to a drivable state (e.g., 10 minutes). In the example, if the corrective measure takes 10 minutes to fix the factors 260a-260c and/or 262, then the decision module 158 may apply the corrective measure 10 minutes before the expected departure time of the driver 202.

In some scenarios, the corrective measure selected may be to do nothing. For example, the processors 106a-106n may detect the factors 260a-260c and/or 262, but the expected departure time of the driver 202 may not be for a few hours. Applying the corrective measures many hours before the expected driving time may be a waste of energy in the battery 120 (e.g., the ice 260a-260c may re-freeze before the expected departure time). The sensor fusion module 152 may combine the current detected conditions with the predicted weather before the expected departure time. In one example, if the predicted weather is expected to warm up, the ice 260a-260c may melt before the expected departure time. The processors 106a-106n may predict the state of the vehicle 50' at the time of the expected departure of the driver 202 to determine if and when to apply the corrective measures.

The processors 106a-106n may select the corrective measures. The processors 106a-106n may generate the signal VCTRL to apply the corrective measures. The interface 104 may receive the signal VCTRL and forward the signal VCTRL' to the appropriate actuators 116. The signal VCTRL and/or the signal VCTRL' may be a correction signal. For example, one of the actuators 116 may be the heating system of the vehicle 50'. In another example, one of the actuators 116 may be the motor for controlling the windshield wipers. The correction signal VCTRL may indicate which of the actuators 116 to activate and/or provide information to control the actuators 116 (e.g., the level of heat that should be generated, the speed of the windshield wipers, etc.). The type of corrective measures and/or the actuators 116 used to produce the corrective measures may be varied according to the design criteria of a particular implementation.

Figure 4:
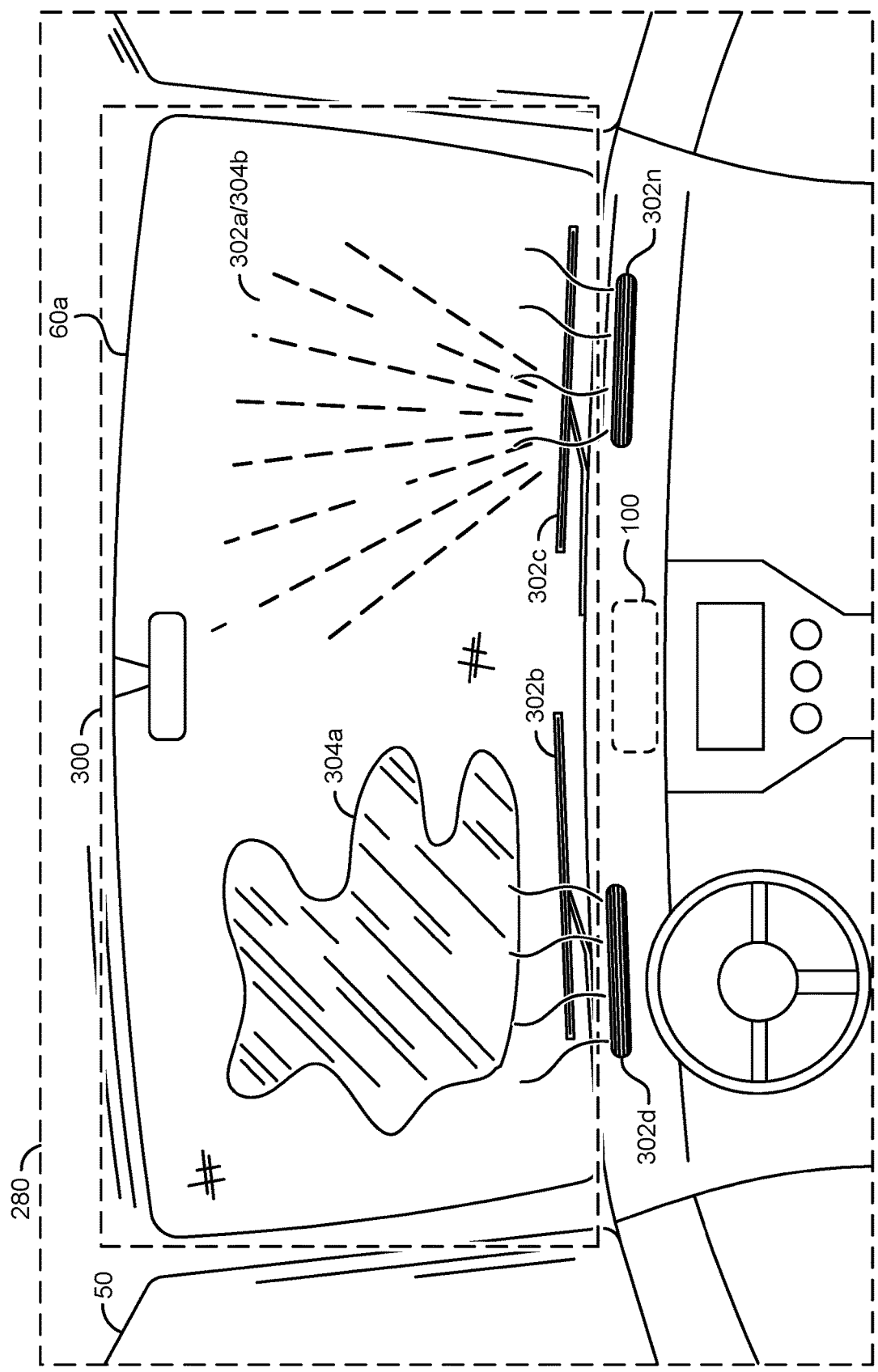
FIG. 4 is a diagram illustrating detecting vehicle issues on a windshield.

Referring to FIG. 4, a diagram illustrating detecting vehicle issues on a windshield is shown. An example video frame 280 is shown. The example video frame 280 may be one of the signals FRAMES_A-FRAMES_N. In an example, the video frame 280 may be captured by the interior capture device 102a' (e.g., the field of view 252a-252b) shown in association with FIG. 3.

The example video frame 280 may provide an interior view of the vehicle 50. The windshield 60a is shown within the video frame 280. The video frame 280 may be a targeted view of the interior of the vehicle 50. A box 300 is shown. The box 300 may represent the computer vision operations of the processors 106a-106n detecting an object. The detected object 300 may be the windshield 60a. For example, the computer vision operations performed by the processors 106a-106n may monitor characteristics (e.g., visibility) of the windshield 60a.

A number of corrective measures 302a-302n are shown in the video frame 280. The video frame 280 shows a number of factors 304a-304b. In the example shown, the factors 304a-304b may be obstructions that reduce visibility through the windshield 60a. The number and/or types of the corrective measures 302a-302n and/or the factors 304a-304b detected may be varied according to the design criteria of a particular implementation.

The factors 304a-304b may reduce a visibility through a window of the vehicle 50 (e.g., through the windshield 60a). An amount of the reduction in visibility may be related to the type of factor. In one example, the factor 304a may be ice (e.g., frost on the windshield 60a). In another example, the factor 304a may be fog (e.g., fog outside of the vehicle 50). In yet another example, the factor 304b may be water (e.g., washer fluid). One or more of the corrective measures 302a-302n may be applied to the windshield 60a to remove the factor 304a and/or reduce visibility loss caused by the factor 304a.

The corrective measures 302a-302n may be automatic responses by the vehicle 50 to counteract the factors 304a-304b. The corrective measure 302a is shown as washer fluid. For example, washer fluid (e.g., anti-freeze) may be used to clean dirt and/or ice from the windshield 60a. The corrective measures 302b-302c are shown as windshield wipers. For example, the wipers 302b-302c may be used to clean dirt, ice and/or rain from the windshield 60a. The corrective measures 302d-302n are shown as being air vents (e.g., air vents for the heating/cooling system of the vehicle 50). The air vents 302*d*-302*n* may be opened and/or aimed to release cold/hot air for the windshield 60*a*. For example, the air vents 302*d*-302*n* may be used to eliminate frost and/or condensation from the windshield 60*a*.

In some embodiments, the corrective measures 302*a*-302*n* may also be one of the factors 304*a*-304*b*. For example, the washer fluid 302*a*/304*b* may be the corrective measure 302*a* in response to frost, but the washer fluid 302*a*/304*b* may also be the factor 304*b* that causes a reduction in visibility. For example, leaving the washer fluid 302*a* may cause the washer fluid to re-freeze, which may be one of the factors 304*a*-304*b* in the future. The wipers 302*b*-302*c* may need to be activated to remove the washer fluid 302*a*/304*b*. For example, a sequence of the corrective measures may be implemented (e.g., first the washer fluid 302*a* may be applied then the wipers 302*b*-302*c* may be activated).

In some embodiments, the capture device 102*a*' used to capture the video frame 280 may be pre-installed at a pre-determined location. The capture device 102*a*' may be a multi-purpose camera. In addition to detecting the factors 304*a*-304*b*, the capture device 104' may be configured for driver monitoring, security monitoring, passenger monitoring, for insurance purposes, etc. For example, the capture device 102*a*' may be implemented to detect break-ins and/or vandalism. In another example, the capture device 102*a*' may detect accidents to provide evidence for insurance claims.

In some embodiments, analysis by the CNN module 150 and/or the video frames FRAMES_A-FRAMES_N may be uploaded to an external device (e.g., a cloud processing service that implements a convolutional neural network) for fleet learning. The fleet learning may be implemented to improve detection of the factors 304*a*-304*b* based on a larger data set (e.g., multiple vehicles) and/or the determination of the corrective measures for the detected factors 304*a*-304*b*.

The factors 304*a*-304*b* may be objects detected by the computer vision operations of the processors 106*a*-106*n*. The computer vision operations implemented by the processors 106*a*-106*n* may be configured to determine a location of the factors 304*a*-304*b*. For example, the CNN module 150 may analyze the captured bitstream (e.g., using machine vision processing), determine a location of the detected factors 304*a*-304*b* on the windshield 60*a*. The CNN module 150 may perform a classification based on the color histogram and/or the high frequency component of the detected object 300 compared to some known reference. The sensor fusion module 152 may further analyze temperature and/or humidity information from the sensors 114. The sensor fusion module 152 may rule out and/or increase a likelihood of certain types of factors. For example, the classification may comprise a confidence level for a particular hypothesis (or diagnosis) for the cause of visibility reduction.

Based on the location and/or the classification of the detected factors 304*a*-304*b* in the video frame 280, the decision module 158 may determine the appropriate response and/or corrective measure for the type of the factors 304*a*-304*b*. The processor 106*a*-106*n* may generate the correction signal VCTRL in response to the determined corrective measures 302*a*-302*n* for the detected factors 304*a*-304*b*. The corrective measures 302*a*-302*n* may be an automatic response by the actuators 116. For example, the signal VCTRL' may be sent to the interface 104 in order to activate the appropriate device to initiate the corrective measure (e.g., windshield wipers, conductive resistors, washer fluid, etc.). Generally the signal VCTRL may correspond to the type of the classified factors 304*a*-304*b*.

The data stored in the memory 108 may correspond to the detected factors 304*a*-304*b*. For example, the lookup table 170 may store a reference size, a reference shape and/or a reference color of the factors 304*a*-304*b*. The reference size, shape and/or colors stored in the memory 108 may be used to compare the current size of the detected factors 304*a*-304*b* in the current video frame 280 for classification. In some embodiments, the lookup table 170 may comprise temperature values, dew point values and/or humidity values. The detected temperature and/or humidity values may be compared to values in the lookup table 170 to perform a classification of the factors 304*a*-304*b* and/or activate one of the corrective measures 302*a*-302*n* (e.g., determine an effectiveness of the corrective measures 302*a*-302*n* for the current environment).

The sensors 114 may be configured to determine a location and/or an orientation of the vehicle 50. In one example, one of the sensors 114 may be a location module used to determine an absolute location of the vehicle 50. The location of the vehicle 50 may be used to determine characteristics of the location (e.g., what angle the sunlight approaches, whether there is shade in a particular parking spot, whether snow plows pile up snow next to the vehicle 50, etc.). In another example, one of the sensors 114 may be a temperature module implemented to determine an inside and/or an outside temperature for the vehicle 50. Sensors on the windshield 60*a* may be used to determine the inside temperature of the glass of the windshield 60*a*. In another example, a humidity sensor may be implemented to determine a humidity level of the environment.

Figure 5:
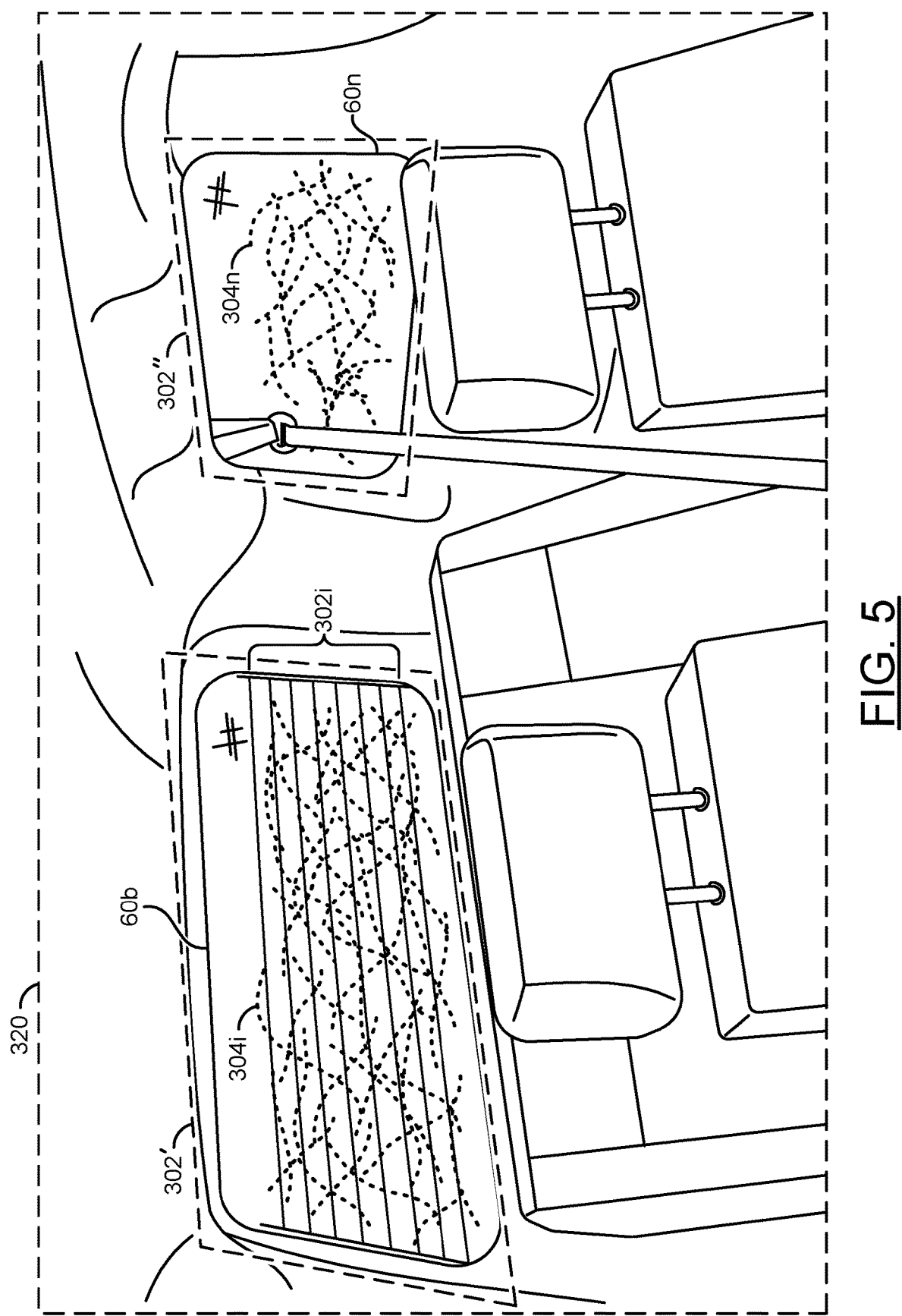
FIG. 5 is a diagram illustrating detecting vehicle issues in a vehicle interior.

Referring to FIG. 5, a diagram illustrating detecting vehicle issues in a vehicle interior is shown. An example video frame 320 is shown. The example video frame 320 may be one of the signals FRAMES_A-FRAMES_N. In an example, the video frame 320 may be captured by the interior capture device 102*a*' (e.g., the field of view 254*a*-254*b*) shown in association with FIG. 3.

The video frame 320 may show details of the rear windshield 60*b*. The video frame 320 may also show details of a side window 60*n*. The rear windshield 60*b* is shown having frost 304*i*. The frost 304*i* reduces visibility of the rear windshield 60*b*. The side window 60*n* is shown having frost 304*n*. The frost 304*n* reduces visibility of the side window 60*n*.

The decision module 158 may use information from the rear windshield 60*b* and/or the side window 60*n* to infer a classification of the type of factor on another window (e.g., the front windshield 60*a*). For example, the frost 304*i* detected on the rear windshield 60*b* and/or the frost 304*n* detected on the side window 60*n* may increase the confidence level of a detection of frost on the front windshield 60*a* (e.g., all windows are likely to be obstructed when frost is the cause of the reduction in visibility). In another example, if the factor on the windshield 60*a* is caused by a build-up of snow on the car hood, then the rear windshield 60*b* and/or the side window 60*n* may not have a similar factor.

The rear windshield 60*b* is shown having one of the corrective measures 302*a*-302*n* (e.g., 302*i*). The corrective measure 302*i* may be implemented as resistive conductors in or on the glass of the rear windshield 60*b* (e.g., de-frost rails). Similar resistive conductors may be implemented on the front windshield 60*a* (or portions of the front windshield 60*a*, such as where the windshield wipers 302*b*-302*c* rest). Further examples of the corrective measures 302*a*-302*n* may be implemented on the other windows 60a-60n. For example, the rear windshield 60b may be configured to have a washer fluid nozzle and/or a wiper blade. The types of corrective measures implemented for each of the windows 60a-60n of the vehicle 50 may be varied according to the design criteria of a particular implementation.

Figure 6:
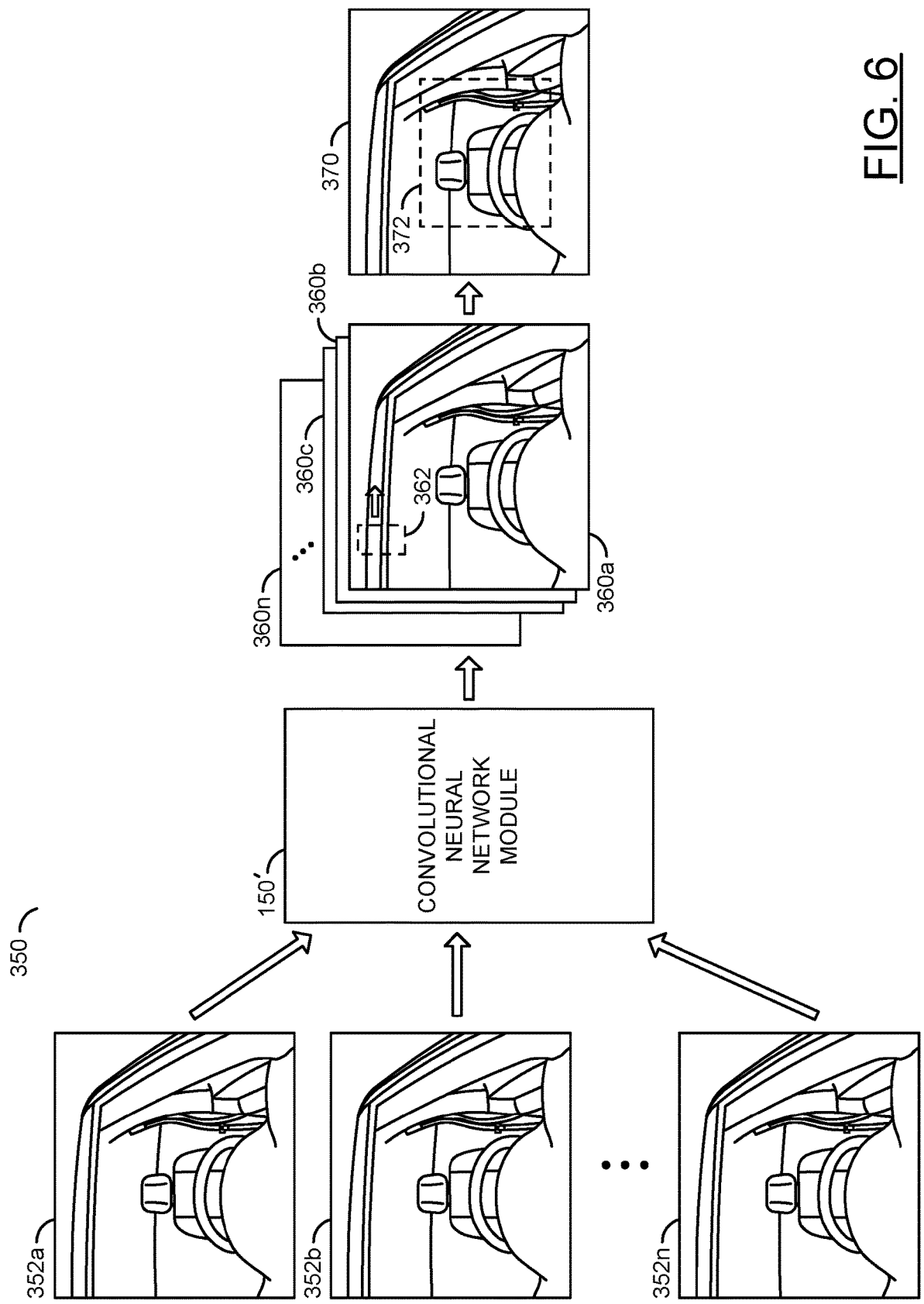
FIG. 6 is a diagram illustrating an example visualization of training a convolutional neural network for object detection using fleet learning.

Referring to FIG. 6, a diagram illustrating an example visualization of training a convolutional neural network for object detection using fleet learning is shown. To detect objects using computer vision, the convolutional neural network 150' may be trained using training data 352a-352n. The training data 352a-352n may comprise a large amount of information (e.g., input video frames). The information for the training data 352a-352n may be received using the video data (e.g., the signals FRAMES_A-FRAMES_N) processed by the video pipeline module 156.

While the apparatus 100 is in operation, the CNN module 150 may continually learn using new video frames as the input training data 352a-352n. However, the processors 106a-106n may be pre-trained (e.g., configured to perform computer vision before installed in the vehicle 50). For example, the results of training data 352a-352n may be pre-programmed and/or loaded into the processors 106a-106n. In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 352a-352n. For example, cameras may be installed in production facilities (e.g., at the end of the production line) to capture many reference images of different types of vehicles to be used as the training data 352a-352n. In the example shown, the training data 352a-352n may capture an unoccupied interior of a vehicle. In another example, the training data 352a-352n may be video frames of a parked vehicle in warm and cold conditions.

Using the training data 352a-352n (e.g., video frames captured from many different vehicles as the vehicles are produced), many training data sets may be available to train the CNN module 150'. In an example, different makes and models may be analyzed. In another example, different interior colors may be analyzed. In some embodiments, the training data 352a-352n may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110).

The CNN module 150' may receive the training data 352a-352n. To perform the training and/or the computer vision operations, the CNN module 150' may generate a number of layers 360a-360n. On each one of the layers 360a-360n, the CNN module 150' may apply a feature detection window 362. In an example, the feature detection window 362 is shown on a portion of the layer 360a. A convolution operation may be applied by the CNN module 150' on each of the layers 360a-360n using the feature detection window 362.

The convolution operation may comprise sliding the feature detection window 362 along the layers 360a-360n while performing calculations (e.g., matrix operations). The feature detection window 362 may apply a filter to pixels and/or extract features associated with each layer 360a-360n. The feature detection window 362 may be applied to a pixel and a number of surrounding pixels. In an example, the layers 360a-360n may be represented as a matrix of values representing pixels and/or features of one of the layers 360a-360n and the filter applied by the feature detection window 362 may be represented as a matrix. The convolution operation may apply a matrix multiplication between the region of the current layer covered by the feature detection window 362. The convolution operation may slide the feature detection window 362 along regions of the layers 360a-360n to generate a result representing each region. The size of the region, the type of operations applied by the filters and/or the number of layers 360a-360n may be varied according to the design criteria of a particular implementation.

Using the convolution operations, the CNN module 150' may compute multiple features for pixels of an input image in each extraction step. For example, each of the layers 360a-360n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 362 operates on a pixel and nearby pixels, the results of the operation may have location invariance. The layers 360a-360n may comprise convolution layers, pooling layers, non-linear layers and/or fully connected layers. In an example, the convolution operations may learn to detect edges from raw pixels (e.g., the first layer 360a), then use the feature from the previous layer (e.g., the detected edges) to detect shapes in a next layer (e.g., 360b) and then use the shapes to detect higher-level features (e.g., facial features) in higher layers and the last layer may be a classifier that uses the higher level features.

Using the input video frames as the training data 352a-352n, the CNN module 150' may be trained. The training may comprise determining weight values for each of the layers 360a-360n. For example, weight values may be determined for each of the layers 360a-360n for feature extraction (e.g., a convolutional layer) and/or for classification (e.g., a fully connected layer). The weight values learned by the CNN module 150' may be varied according to the design criteria of a particular implementation.

The CNN module 150' may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150' to extract features from the training data 352a-352n may be varied according to the design criteria of a particular implementation.

The CNN module 150' may consume input images (e.g., the training data 352a-352n) that have multiple color channels (e.g., a luminance channel and two chrominance channels). A color detection process implemented by the video pipeline module 156 may be implemented to output images with color likelihood (or probability) values for a particular color at one or more pixel locations in the input images. For example, shared buffers between the video pipeline module 156 and/or the CNN module 150' may enable information sharing between components of the processors 106a-106n. The color detection process may be used to extract features from the training data 352a-352n.

The color detection and/or feature extraction process is generally operational to determine a color likelihood value that pixels in each pixel location of an input image (e.g., the training data 352a-352n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150' may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicates a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 362 may be considered by the color detection process on one of the layers 360a-360b. The feature extraction window 362 may consider a pixel of interest. In an example, the pixel of interest may be a current pixel location being color classified. The feature extraction window 362 may generally represent a local context and contrast around the pixel of interest.

The pixels of the training data 352a-352n may each be represented as components in multiple color channels. In some designs, the color channels may include a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the CNN module 150' may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150' generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150' may generate one or more reference video frames 370. The reference video frame 370 may comprise masks and/or categorized instances of reference objects 372. The reference objects 372 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases. The computer vision operations performed by the CNN module 150' may determine a size, shape, orientation and/or arrangement of a recognized object.

By analyzing a number of video frames in sequence, the computer vision operations performed by the CNN module 150' may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150'.

In some embodiments, the captured video frames FRAMES_A-FRAMES_N may comprise video frames captured before the corrective measures 302a-302n have been applied, while the corrective measures 302a-302n are being applied and after the corrective measures 302a-302n have been applied. The decision module 158 may compare the objects (e.g., the factors 304a-304n) before the corrective measures 302a-302n have been applied to the objects after the corrective measures 302a-302n have been applied for a visual confirmation of improved visibility. The comparison may also be used to determine the amount of time to eliminate the factors 304a-304n (e.g., how after the corrective measures 302a-302n have been applied before the vehicle 50 is in a drivable state).

The video frames before, during and after the corrective measures 302a-302n have been applied may also be used as the training data 352a-352n. The training data 352a-352n may enable of the CNN module 150' to determine the amount of time for eliminating the factors 304a-304n for multiple different vehicles in similar and/or different scenarios (e.g., different weather conditions, different makes and models of vehicles, different amounts of corrective measures applied, etc.). The training data 352a-352n may be used to enable the CNN module 150' to learn over time from a fleet of vehicles to accurately predict the state of the vehicle 50 and/or predict the effectiveness of various corrective measures.

Figure 7:
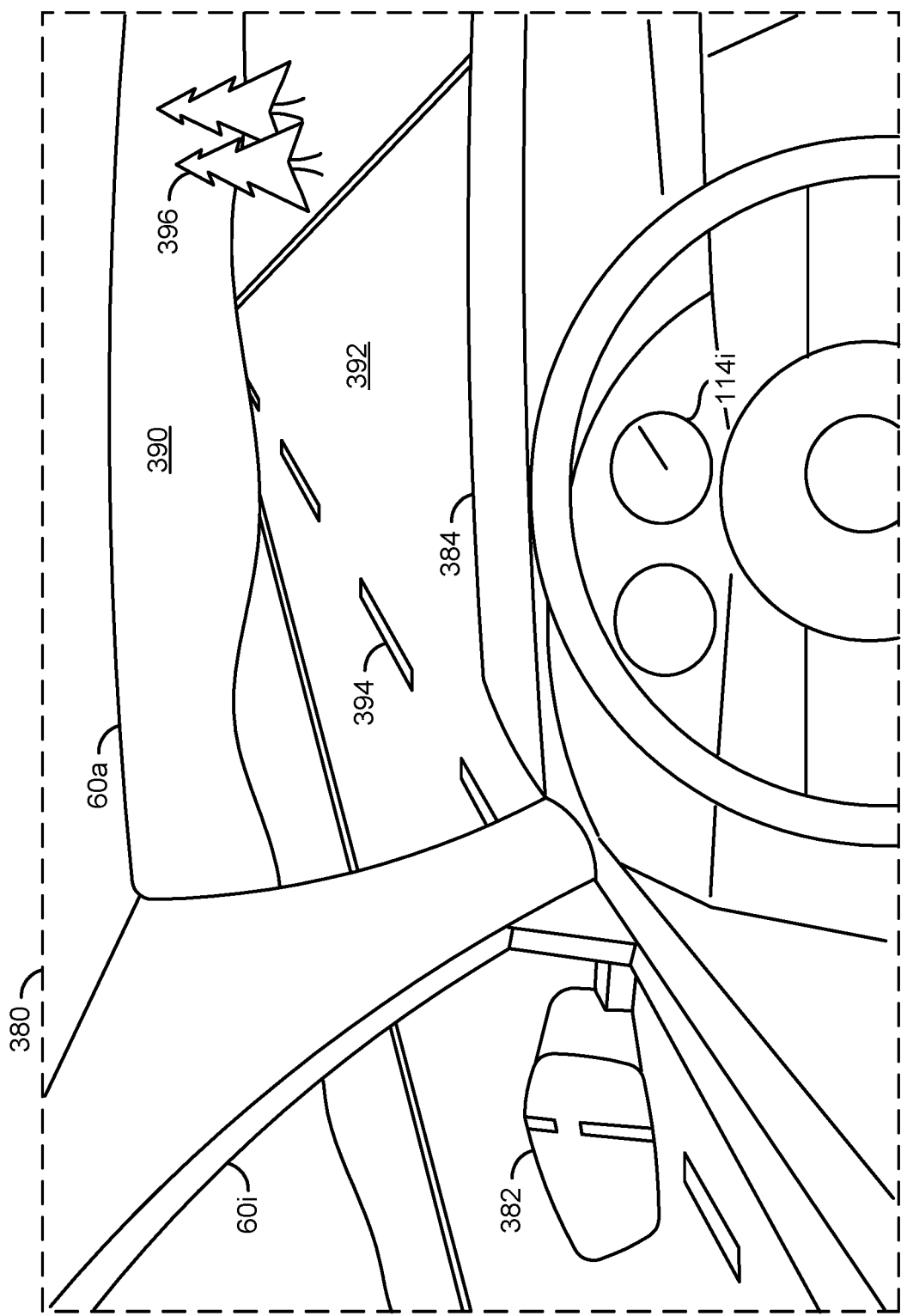
FIG. 7 is a diagram illustrating an example video frame in a warm weather condition.

Referring to FIG. 7, a diagram illustrating an example video frame in a warm weather condition is shown. An example video frame 380 is shown. The example video frame 380 may provide a view through the front windshield 60a, the driver side window 60i and/or a portion of the interior of the vehicle 50. The example video frame 380 may correspond to a video frame captured of the vehicle 50 that is parked during warm weather conditions.

The processors 106a-106n may be configured to constantly, continuously and/or periodically monitor the state of vehicle 50 (e.g., the vehicle 50 and the surroundings) when the vehicle 50 is parked. The monitoring of the state of the vehicle 50 may comprise a combination of reading the sensors 114, receiving external information (e.g., weather data and/or location data) and/or performing the computer vision operations. The processors 106a-106n may detect issues (e.g., the factors 304a-304n) by analyzing the visual data and correlating the information determined using the computer vision operations with expected behavior. In one example, if the computer vision operations detect rain that is then followed by freezing temperatures one of the expected behaviors may be frozen door handles. The expected behavior may be inferences about future conditions based on current observations and known relationships (e.g., freezing temperatures and water result in ice, ice reduces visibility, ice increases travel time, ice and warming temperatures result in sleet, etc.)

The computer vision operations implemented by the processors 106a-106n may look for various factors. The corrective measures may be applied when the factors reach a particular threshold. In one example, the factors may comprise a height of snow build-up on top of the hood and around the vehicle 50 (e.g., wipers may be applied after the snow build-up reaches a particular threshold height). In another example, the factors may comprise weather conditions (e.g., received via the wireless LTE connection and/or by the computer vision operations). In yet another example, the factors may comprise the condition of the windows 60a-60n (e.g., as shown in association with FIG. 4 and FIG. 5). In still another example, the factors may comprise the condition of outside mirrors determined using the computer vision operations (e.g., depending on location and field of view of each camera). The various factors analyzed and/or the method of detecting the factors may be varied according to the design criteria of a particular implementation.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the use of the sensors 114 (e.g., radar, occupancy sensors, temperature sensors, location/orientation sensors, etc.). The type of capture devices implemented may be varied according to the design criteria of a particular implementation.

In the example shown, the video frame 380 may be captured by a single camera. Objects such as a sideview mirror 382 is shown through the window 60i. Objects such as a hood 384 of the vehicle 50 is shown through the windshield 60a. Objects such as the sky 390, a road 392, road markings 394 and trees 396 are shown. For example, the vehicle 50 may be parked on the side of the road 392. The processors 106a-106n may perform the computer vision operations on the characteristics of the environment near the vehicle 50 to determine and/or predict the state of the vehicle 50.

The computer vision operations performed by the processors 106a-106n may analyze the characteristics of objects detected in the example video frame 380. In an example, analysis may detect that a reflective view is visible in the sideview mirror 382 (e.g., there is no factor obstructing the view in the mirror 382). In another example, the hood 384 may be analyzed for snow build-up (e.g., there is no snow build-up on the hood 384). The sky 390 may be analyzed (e.g., a clear sky may be detected). The characteristics of the road 392 may be analyzed (e.g., no obstructions detected and the lane markings 394 are visible). The trees 396 may be analyzed (e.g., no snow build-up near the trees or on the branches). Based on the computer vision operations performed on the example video frame 380, the state of the vehicle may be drivable.

The sensor fusion module 152 may further analyze weather from the external weather service and/or retrieve sensor readings. In the example shown, the sensor 114i may be a temperature gauge that indicates a high temperature. The external weather service may indicate that the weather is warm and/or no freezing temperatures are expected. Based on the combination of data sources analyzed by the sensor fusion module 152, the predicted state of the vehicle 50 may be drivable.

In warm conditions, the corrective measures 302a-302n may not need to be performed to prepare the vehicle 50. However, in some embodiments, even though the weather conditions are warm the vehicle 50 may not be drivable. For example, excessive rain may be a factor the leads to flooding. If the vehicle 50 is determined not to be drivable due to flooding (e.g., by analyzing the area near the vehicle 50 such as the road 392), the corrective measures 302a-302n may not be able to make the vehicle 50 drivable. If the vehicle 50 cannot be made drivable, the corrective measures 302a-302n may be configured to notify the driver 202 and/or contact help (e.g., call a cab, request an Uber driver, call a tow truck, etc.). For example, the communication device 110 may be configured to perform one of the corrective measures 302a-302n.

In some embodiments, the corrective measures 302a-302n may be applied even if the vehicle 50 is drivable. For example, in the warm weather scenario 380, the vehicle 50 may be drivable but the weather information may indicate heavy rain during the expected departure time of the driver 202. The corrective measure 302a-302n selected may be to use the communication device 110 to contact the user device 122 with a message suggesting that the driver 202 leave earlier than planned because the driver 202 should drive slower in the rain.

Figure 8:
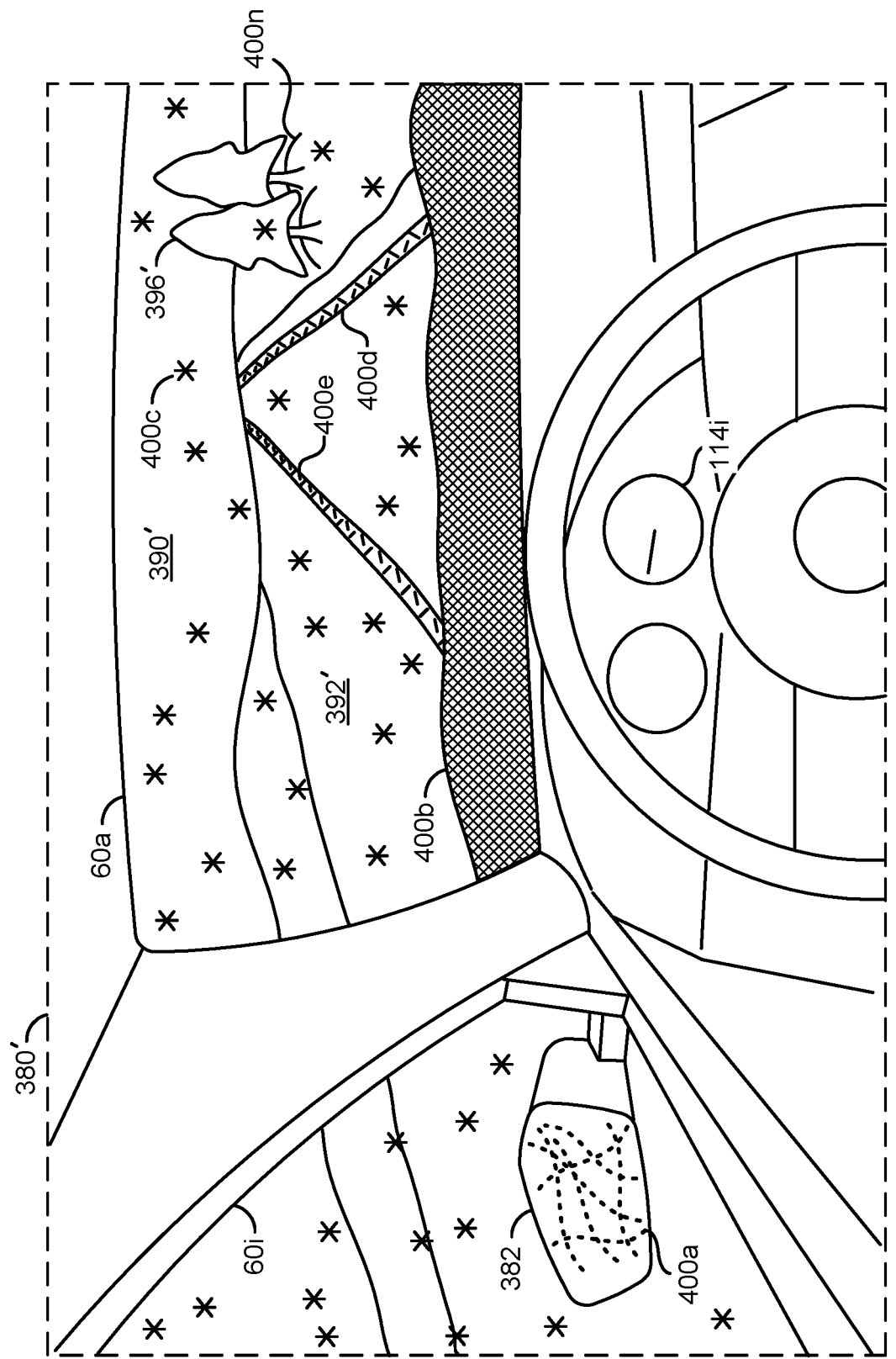
FIG. 8 is a diagram illustrating an example video frame in a cold weather condition.

Referring to FIG. 8, a diagram illustrating an example video frame in a cold weather condition is shown. The example video frame 380' is shown. The example video frame 380' may provide a view through the front windshield 60a, the driver side window 60i and/or a portion of the interior of the vehicle 50. The example video frame 380' may correspond to a video frame captured of the vehicle 50 that is parked during cold weather conditions. In the example shown, the vehicle 50 may be parked in the same location and/or provide the same view as the warm weather example video frame 380 shown in association with FIG. 7.

The processors 106a-106n may perform the computer vision operations on the characteristics of the environment near the vehicle 50 to determine and/or predict the state of the vehicle 50. In an example, a reflective view may not be visible in the sideview mirror 382 (e.g., visibility through a sideview mirror may be one of the factors that affect the state of the vehicle 50). A factor (e.g., frost) 400a is shown obstructing the view in the mirror 382). In another example, the hood 384 of the vehicle 50 may not be visible. Snow build-up 400b may be a factor that indicates the state of the vehicle 50. The sky 390' may be analyzed and a factor (e.g., snowflakes 400c) may indicate cold weather conditions. The characteristics of the road 392' may be analyzed. For example, the road markings 394 are not visible (e.g., possibly indicating unsafe driving conditions). Factors 400d-400e may be snow tracks that indicate that the road 392' is covered in snow and/or that the vehicle 50 could be stuck in the snow (e.g., undrivable). The trees 396' may be analyzed (e.g., there may be snow build-up on the trees). Factor 400n may be a snow mound near the base of the trees 396'. For example, the computer vision operations performed by the processors 106a-106n may be configured to measure a depth of the snow mound 400n (e.g., by comparing to the video frame 380 captured during the warm weather, based on a depth of the hood snow build-up 400b, adding an accumulation of snow based on how much snow has been cleared from the hood 384 by the windshield wipers, based on previous video frames before the snowfall, etc.) to determine how much snow has fallen (e.g., to determine whether or not enough snow has fallen that the vehicle 50 may be stuck). Based on the computer vision operations performed on the example video frame 380, the state of the vehicle may be undrivable.

The sensor fusion module 152 may further analyze weather from the external weather service and/or retrieve sensor readings. In the example shown, the sensor 114i may be a temperature gauge that indicates a low temperature. The external weather service may indicate that the weather includes snowfall (e.g., including an amount of precipitation predicted) and/or freezing temperatures. Based on the combination of data sources analyzed by the sensor fusion module 152, the predicted state of the vehicle 50 may be undrivable.

The corrective measures 302a-302n may be applied in response to the detected state of the vehicle 50, the predicted state of the vehicle 50 and/or the factors 400a-400n. For example, the windshield wipers 302b-302c may be activated to remove the snowfall 400c. In another example, one of the corrective measures 302a-302n may be activating a heating element in the sideview mirror 382 to de-frost the frost 400a. Similarly a rear wiper and/or the resistive conductors 302i may be activated to melt snow build-up on the rear windshield 60b. One of the corrective measures 302a-302n may be activating windshield heat and/or general heating of the vehicle 50 to remove the ice/snow build-up 400b. Heating the air in the vehicle 50 may remove one or more of the factors 400a-400n. Similarly, the heat may be directed to areas as needed in response to the detection of an issue (the air vent 302d may be activated and directed towards the windshield 60a to de-frost). The number, type and/or sequence of the corrective measures 302a-302n applied may be varied according to the design criteria of a particular implementation.

Some of the factors 400a-400n may not be removed and/or eliminated by the corrective measures 302a-302n. For example, if the road 392' is a driveway and the snow mounds 400n indicate that there is deep snow, the driveway 392' may need to be shoveled and/or plowed (e.g., the vehicle 50 is unable to clear the driveway). One of the corrective measures 302a-302n may be to communicate the signal LTE to send a notification to the user device 122. For example, the notification may provide a message to the driver 202 that the driveway 392' may need to be shoveled before the vehicle 50 may be driven. In another example, the signal LTE may be used to contact a snow plow to clear the road 392'. In some embodiments, if the vehicle 50 is an autonomous vehicle and the vehicle 50 has a snow plow attachment, one of the corrective measures 302a-302n may be to initiate autonomous driving to clear the road 392'.

Figure 9:
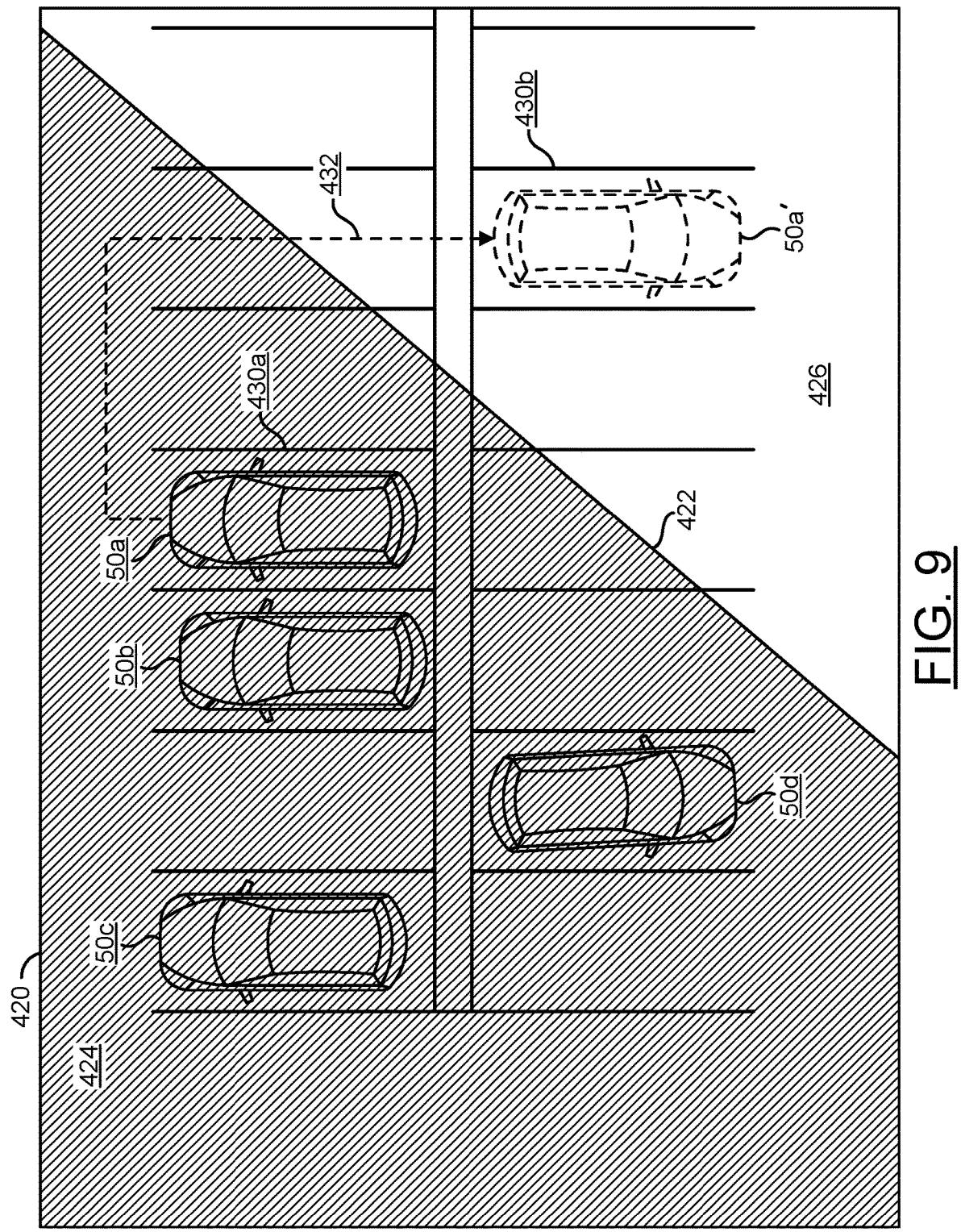
FIG. 9 is a diagram illustrating an example of autonomously moving a vehicle location based on location information.

Referring to FIG. 9, a diagram illustrating an example of autonomously moving a vehicle location based on location information is shown. An example parking lot 420 is shown. A number of the vehicles 50a-50d are shown in the parking lot 420. At least one of the vehicles (e.g., the vehicle 50a) may implement the apparatus 100.

The sensor fusion module 152 may utilize location information as one source of data for determining the state of the vehicle 50. The location information may comprise characteristics of a particular location. The characteristics of a particular location may comprise data about the particular location and/or may change over time. In one example, the location information may comprise sunlight information (e.g., at what time of day sunlight covers the particular location, at what time of day the particular location is shady, the direction that the sunlight approaches, what time the sun sets/rises throughout the year, etc.). In another example, the location information may comprise coverage characteristics (e.g., whether the location is under a tree that provides shade and/or protection from the elements, whether the location is next to a structure that provides some protection from the elements, whether there are any structures such as parking garages that provide coverage nearby). The location information may correspond to a particular granularity of the particular location (e.g., the particular location may cover a couple of square feet, a mile, etc.). The location information may be learned by the processors 106a-106n over time (e.g., the driver 202 parks in a similar location daily) and/or based on fleet learning (e.g., learned from previous vehicles that have parked in the same location). The type of location-based data provided by the location information may be varied according to the design criteria of a particular implementation.

A line 422 is shown in the example parking lot 420. A shaded area 424 is shown. An unshaded area 426 is shown. The shaded area 424 may represent an area that does not have direct sunlight (e.g., shade may be caused by a nearby building). The unshaded area 426 may represent an area that does have direct sunlight. The line 422 may be the edge of the shade. In the example shown, the vehicles 50a-50d are all shown in the shade 424.

The corrective measures 302a-302n may be applied in response to a predicted state of the vehicle 50 at a predetermined time. Even if the current state of the vehicle 50 is not drivable, the corrective measures 302a-302n may not be applied if the decision module 158 predicts that the state of the vehicle 50 will be drivable at the pre-determined time (e.g., at an expected departure time). In one example, the direct sunlight in the sunny area 426 may be a naturally occurring factor that may help the vehicle 50 be drivable. For example, the direct sunlight 426 may naturally de-frost the windshield 60a and/or melt snow. The decision module 158 may decide that the corrective measure selected may be to wait for the naturally occurring factor instead of actively applying one of the corrective measures 302a-302n such as turning on the heat.

In one example, the location information may provide the information about the location of the shade line 422 for the particular location. For example, the location information may indicate where the shade line will move throughout the day. If the shade line 422 will move to the right, the vehicles 50a-50d may remain in the shade 424 (e.g., one of the active corrective measures 302a-302n may be applied to change the state of the vehicle 50a to be drivable). If the shade line 422 will move to the left, the sunlight 426 may eventually cover the vehicle 50a. If the weather information indicates that there will not be cloud cover when the sunlight 426 covers the vehicle 50a, then one or more of the corrective measures 302a-302n may not need to be applied (e.g., the sunlight 426 may naturally change the state of the vehicle 50). Implementing the corrective measure 302a-302n of intelligently waiting for the sunlight 426 may conserve the energy of the battery 120. In some embodiments, the processors 106a-106n may alert the driver 202 to park in another location based on the location information and/or the predicted state of the vehicle 50a.

In some embodiments, the vehicle 50a may be an autonomous vehicle. A line 432 is from a current parking spot 430a of the vehicle 50a to a parking spot 430b. The line 432 may represent an autonomous driving path of the vehicle 50a. For example, the vehicle 50a may autonomously drive from the parking spot 430a to the parking spot 430b. Autonomously driving the vehicle 50a may be one of the corrective measures 302a-302n. In the example shown, the decision module 158 may determine that the corrective measure to apply may be to move the vehicle from the parking spot 430a in the shady area 424 to the parking spot 430b in the sunny area 426. In another example, the decision module 158 may determine the corrective measures 302a-302n to apply may comprise autonomously driving the vehicle 50a to a location that has coverage (e.g., a parking garage).

In the example shown, the vehicle 50a may be parked in a cold environment and moving to the sunlight 426 may be preferred for making the vehicle 50a drivable. In some embodiments, the processors 106a-106n may apply the corrective measures 302a-302n to make the vehicle 50a more comfortable for the driver 202. For example, in the summer when the weather is very hot, the corrective measures 302a-302n may be selected to move the vehicle 50a from the sunny area 426 to the shade 424 to enable the vehicle 50a to cool off before the driver 202 enters. In the example shown, the location corresponds to the parking lot 420. Similarly, the location information may correspond to a particular location with a smaller granularity (e.g., a driveway where parking at one end of the driveway has different conditions than another end of the driveway) and/or a particular location with a larger granularity (e.g., moving to another side of the street).

Figure 10:
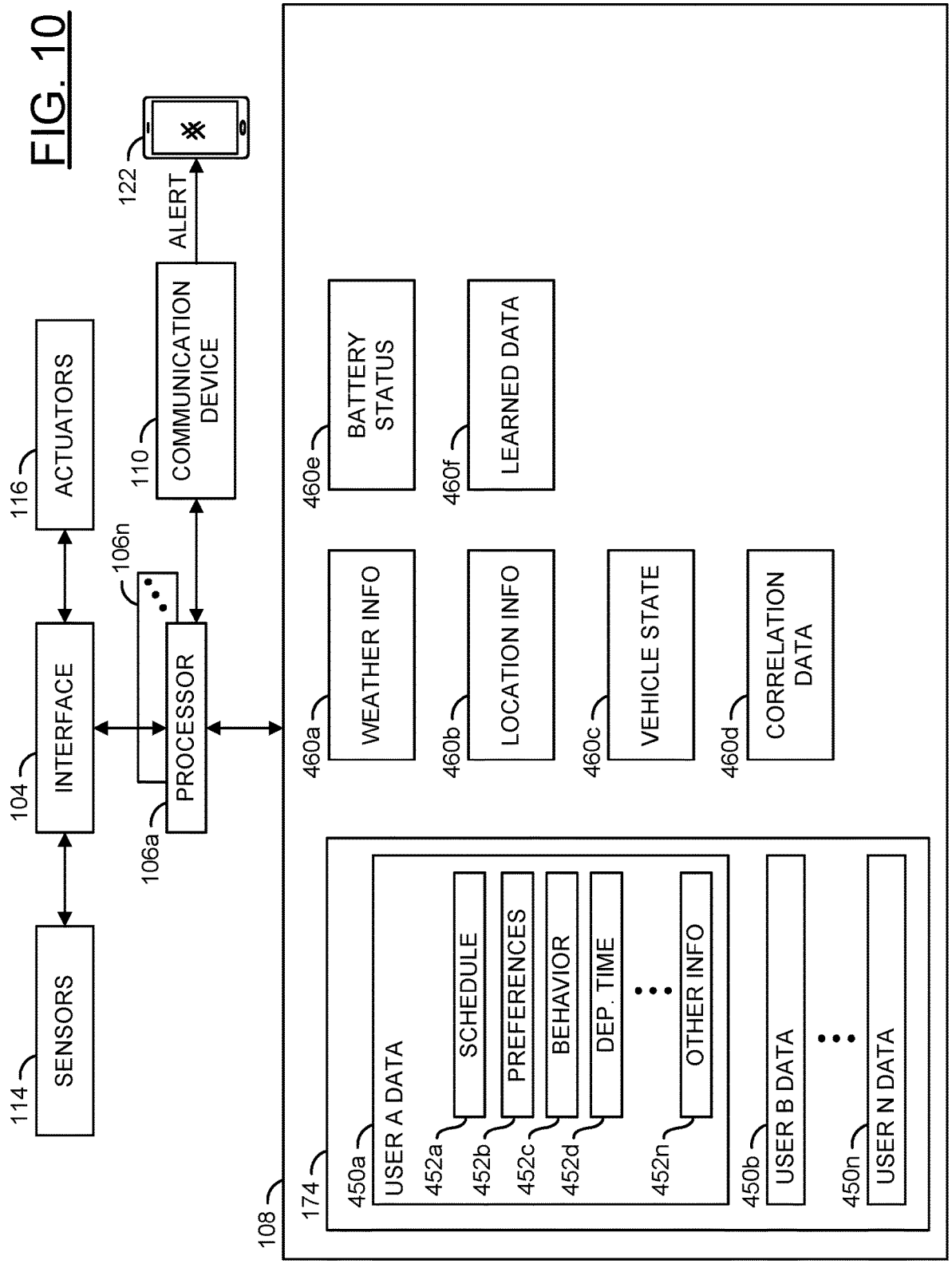
FIG. 10 is a block diagram illustrating user data storage.

Referring to FIG. 10, a block diagram illustrating user data storage is shown. The interface 104, the processors 106a-106n, the memory 108, the sensors 114, the actuators 116 and/or the user device 122 are shown.

The communication device 110 is shown transmitting a signal (e.g., ALERT) to the user device 122. The signal ALERT may represent one of the corrective measures 302a-302n. The signal ALERT may be a notification sent to the smartphone 122 of the driver 202. For example, the decision module 158 may be configured to predict and/or observe an effectiveness of the available corrective measures 302a-302n. If the corrective measures 302a-302n are determined to be insufficient (e.g., snow build-up will block the doors and/or the corrective measures 302a-302n will drain more energy than is allotted), then the notification may be sent to the smartphone 122. The notification may alert the driver 202 through variety of means (e.g., sending a message to the cell phone, setting different wake-up time by integration with a timer app, etc.). The notification ALERT may inform the driver 202 to change the planned departure time to allow the driver 202 to prepare the vehicle 50 (e.g., scrape the windows 60a-60n, clear away the snow build-up, shovel the driveway, allow more driving time due to slow road conditions, etc.).

The user data 174 is shown in the memory 108. The user data may comprise blocks (or circuits or modules) 450a-450n. The blocks 450a-450n may represent user data for a number of different users. Each user 450a-450n may potentially be the driver 202. The user data 450a is shown comprising a number of blocks (or circuits or modules) 452a-452n. For clarity, the blocks 452a-452n are shown only for the user 450a. However, each of the users 450a-450n may similarly comprise the blocks 452a-452n. The blocks 452a-452n may comprise the user data storage.

The user data 450a-450n may each comprise a schedule 452a, preferences 452b, behavior 452c, a departure time 452d, etc. The schedule 452a may comprise calendar data for the user (e.g., times of meetings, work schedule, events, when the kids need to be picked up, etc.). The schedule 452a may be determined by linking with the smartphone 122 (e.g., retrieving information from a calendar app). The schedule 452a may be used to determine one or more of the departure times 452d. The schedule 452a may further comprise how far the user 450a is driving (e.g., to reserve enough energy for the vehicle 50 to reach the destination when selecting the corrective measures 302a-302n).

The preferences 452b may comprise individualized information for the particular one of the users 450a-450n. For example, the preferences 452b may comprise a preferred temperature within the vehicle 50. In another example, the preferences 452b may be whether to pre-heat the seats of the vehicle 50. The preferences 452b may be used as a secondary condition for the state of the vehicle after the state of the vehicle 50 is determined to be drivable (e.g., the corrective measures 302a-302n may first ensure that there is visibility for driving by de-frosting the windshield 60a, then if there is enough energy and/or time, pre-heat the vehicle 50 according to the preferences 452b). In some embodiments, the preferences 452b may comprise user settings for applying the corrective measures 302a-302n. The user settings may provide options for maintaining a drivability of the vehicle 50 and/or the surroundings of said vehicle 50. For example, the user may select user settings that cause the processors 106a-106n to prepare the vehicle 50 every day at 7 am. In another example, the user may select a user setting that causes the processors 106a-106n to prepare the vehicle 50 in a particular amount of time (e.g., the driver 202 is eating at a restaurant and expects to leave in 20 minutes and may select the user setting to prepare the vehicle 50 to be in a drivable state in 20 minutes).

The behavior 452c may be used for intelligently learning the patterns of the users 450a-450n. In one example, the learning the behavior 452c of the users 450a-450n may be used to set the departure time 452d. The behavior 452c may comprise analyzing departure times and/or usage times of the vehicle 50. For example, the processors 106a-106n may learn that the user 450a drives weekdays at 8:30 am and then again at 5:00 pm (e.g., to leave for work and drive home from work). Based on the learned behavior the departure times 452d may be set for 8:30 am and 5:00 pm and the corrective measures 302a-302n may be applied in advance to ensure the vehicle 50 is drivable at the learned times.

The behavior 452c may further be used to determine driving patterns. For example, some driving patterns may consume greater amounts of energy from the battery 120. The user 450a may be a more aggressive driver that accelerates quickly and consumes energy faster than the user 450b. Based on the behavior 452c, when selecting the corrective measures 302a-302n the decision module 158 may reserve more battery power for driving when the user 450a is driving (e.g., fewer power may be available for the corrective measures 302a-302n) than for the user 450b (e.g., more power may be available for the corrective measures 302a-302n since less may be used for driving). Similarly, the behavior data 452c may comprise information about how far each of the users 450a-450n drives (e.g., to reserve enough battery power for the drive).

The departure time 452d may be the pre-determined time that the users 450a-450n will drive. In one example, the departure time 452d may be manually entered by the users 450a-450n (e.g., a manual input). In another example, the departure time 452d may be determined by retrieving information from the user device 122 (e.g., calendar and/or event information). In yet another example, the departure time 452d may be learned based on the behavior 452c. The method of determining the departure time 452d may be varied according to the design criteria of a particular implementation.

The decision module 158 may be configured to time the application of the corrective measures 302a-302n depending on departure time 452d. The timing of the application of the corrective measures 302a-302n may take into account temperature, humidity and/or visual observation of the factors 400a-400n and/or other inputs. The decision module 158 may be configured to apply the corrective measures 302a-302n at some time before the departure time 452d to ensure that the state of the vehicle 50 is drivable at the departure time 452d.

The memory 108 is shown further comprising a blocks (or circuits or modules) 460a-460f. The block 460a may comprise the weather information. The block 460b may comprise the location information. The block 460c may comprise the vehicle state. The block 460d may comprise correlation data. The block 460e may comprise a status of the battery 120. The battery 460f may comprise learned data.

The weather information 460a may comprise weather data (e.g., temperature, precipitation, cloud coverage, wind speed, etc.) retrieved from external sources. For example, the weather information 460a may be retrieved using the communication device 110 via a third party weather service (e.g., a weather network, open-source weather information, etc.). The weather information 460a may comprise current weather conditions for the current location of the vehicle 50 and/or predicted weather conditions (e.g., an hourly forecast, a 3-day forecast, a 7-day forecast, etc.).

The location information 460b may comprise the location information described in association with FIG. 9. The location information 460b may be retrieved and/or access based on readings from one of the sensors 114 (e.g., a GPS and/or location module configured to provide location coordinates). The location information 460b may be received from a third party source, determined based on fleet learning and/or may be learned based on computer vision operations performed by the processors 106a-106n (e.g., performing computer vision operations at a location that the vehicle 50 is commonly parked at).

The vehicle state 460c may comprise the current state of the vehicle 50 and/or the predicted state of the vehicle 50. The vehicle state 50 may track one of more of the factors 400a-400n over time (e.g., whether the factor is disappearing, whether the factor is accumulating/increasing, etc.). In one example, the vehicle state 460c may be an undrivable state (e.g., no visibility, vehicle is unable to move, vehicle is inaccessible, etc.). In another example, the vehicle state 460c may be a drivable state (the driver 202 may be able to access and drive the vehicle 50). In yet another example, the vehicle state 460c may comprise information about driving conditions (e.g., the vehicle 50 may be drivable but the weather conditions indicate that the amount of time needed to drive has increased (e.g., slippery and/or slow driving conditions).

The correlation data 460d may comprise information used to determine an effect of weather conditions on the detected objects. For example, the correlation data 460d may correlate freezing temperatures and rain detected by the computer vision with freezing and/or ice. In another example, the correlation data 460d may correlate ice detected using computer vision and warming temperatures with sleet and/or flooding conditions. The correlation data 460d may be implemented to determine the expected behavior. The type of correlations may be varied according to the design criteria of a particular implementation.

In some embodiments, the correlation data 460d may correlate cold temperatures with difficulty starting the vehicle 50. For example, for an internal combustion engine vehicle, one of the corrective measures 302a-302n may be attempting to start the vehicle 50 before the expected departure time 452d to ensure that the vehicle 50 is able to start. Pre-starting may be performed as one of the corrective measures 302a-302n based on predicting the overall environment, checking internal temperature sensors 114, etc. Similarly, for an electric vehicle and/or for the battery 120, efficiency and/or longevity may decrease in cold conditions and one of the corrective measures 302a-302n may comprise pre-heating the battery 120.

The battery status 460e may comprise characteristics of the battery 120. For example, the battery status 460e may comprise a total capacity, an amount of energy remaining, a predicted discharge time (e.g., based on the driver behavior 452c and/or the destination), number of power cycles remaining, battery temperature, etc. The signal BINFO may provide data from the battery 120 for the battery status 460e.

The decision module 158 may be configured to balance application of the corrective measures 302a-302n with the battery status 460e. For example, the processors 106a-106n may trade off conserving energy of the battery against solving the problem caused by the factors 400a-400n (e.g., changing the vehicle state 460c to drivable). In one example, if the vehicle 50 is plugged in with a charging cable (e.g., no concern for running out of energy), the processors 106a-106n may aggressively select the corrective measures 302a-302n and/or accommodate the preferences 452b. In another example, if the battery status 460e indicates low power available, the sensor fusion module 152 may analyze the schedule 452a for the next event and predict a required range to reach the destination. The corrective measures 302a-302n may be selected to ensure that the vehicle is drivable and if the vehicle 50 is unable to reach the intended destination then the vehicle state 460e may be considered an undrivable state.

A less aggressive selection of the corrective measures 302a-302n may favor energy conservation over effectiveness of eliminating the factors 400a-400n. For example, applying the heat may be the most effective corrective measure for de-icing the windshield 60a, but may be an aggressive corrective measure due to high energy consumption. In another example, activating the windshield wipers 302b-302c with the washer fluid 302a may be less effective than heat, but may be a less aggressive corrective measure due to low energy consumption (e.g., additionally consumption of a resource such as washer fluid may be considered). In some scenarios, when there is insufficient battery power to actively apply the corrective measures 302a-302n, a passive corrective measure of waiting and doing nothing may be selected (e.g., applying heat may be more effective than waiting for sunlight, but waiting for the sunlight 426 may not consume any energy).

The learned data 460f may comprise information determined by continually monitoring the factors 400a-400n as the corrective measures 302a-302n are applied. The learned data 460f may track how effective the corrective measures 302a-302n are for reducing and/or eliminating the factors 400a-400n. The learned data 460f may track how long corrective measures 302a-302n take to change the vehicle state 460c to drivable (e.g., based on the temperature, the make/model of the vehicle 50, the combination of corrective measures used, etc.). In one example, the learned data 460f may determine that the corrective measure of heat application may clear the windshield in 15 minutes and consume a large amount of energy. In another example, the learned data 460f may determine that the corrective measures 302a-302c of applying washer fluid and wipers may consume a small amount of energy, an amount of a consumable product (e.g., the washer fluid) and may clean clear the windshield within 2 minutes. However, the learned data 460f may further determine that using the wipers 302b-302c on the ice may damage the rubber of the wipers. The learned data 460f may further determine whether the corrective measures 302a-302n should be applied continuously (e.g., the wipers should be activated every time there is 1 inch of snow built-up to prevent excessive accumulation that may not be able to be corrected) and others corrective measures only need to be applied just before leaving (e.g., such as de-frosting frozen car lock/door handles). The learned data 460f may be uploaded to a central service for fleet learning and/or updated based on learned data downloaded from the central service. The decision module 158 may select one or more of the corrective measures 302a-302n based on the knowledge acquired from the learned data 460f.

Figure 11:
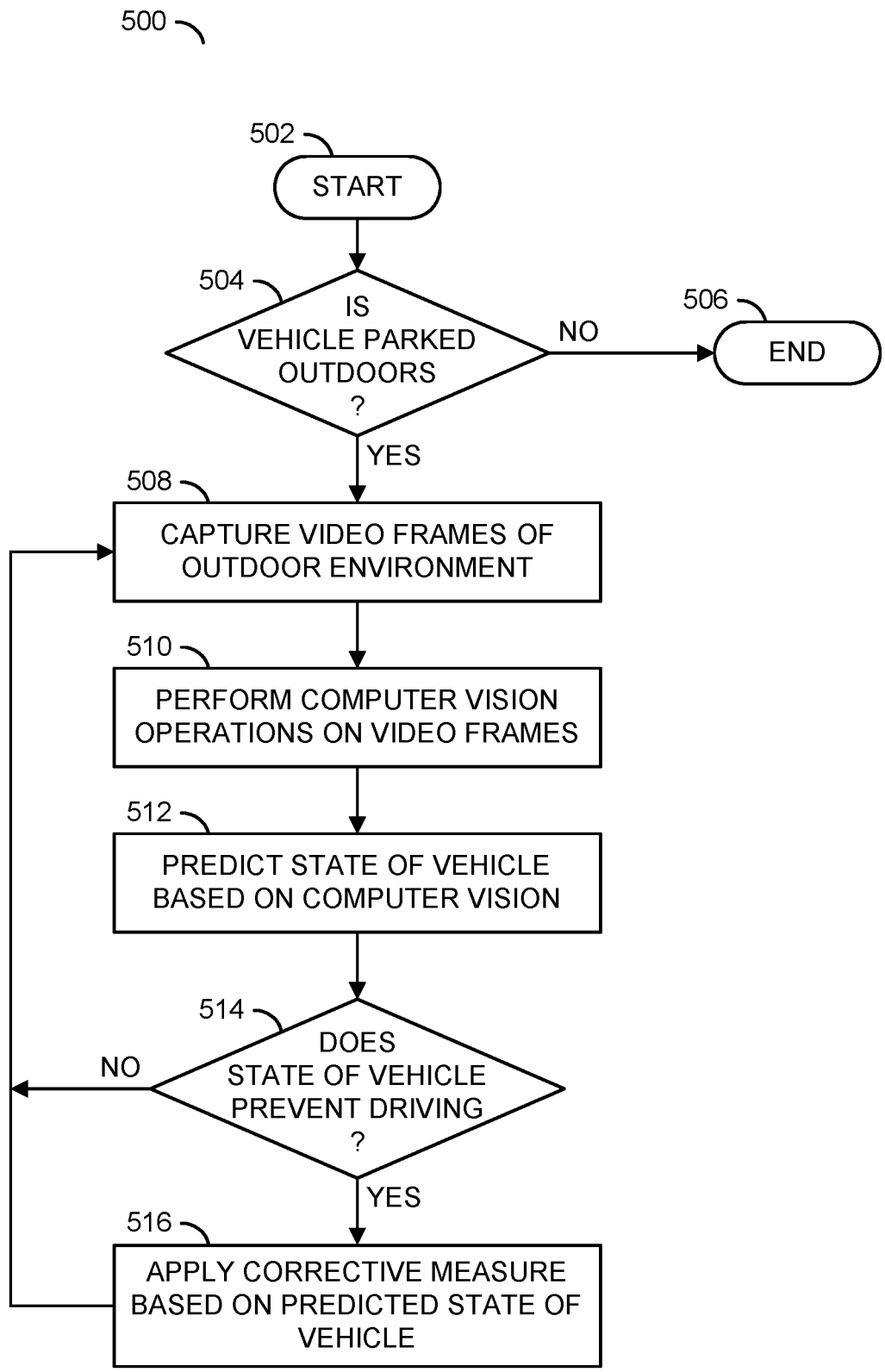
FIG. 11 is a flow diagram illustrating a method for using camera data to manage a vehicle parked outside in cold climates.

Referring to FIG. 11, a method (or process) 500 is shown. The method 500 may use camera data to manage a vehicle parked outside in cold climates. The method 500 generally comprises a step (or state) 502, a decision step (or state) 504, a step (or state) 506, a step (or state) 508, a step (or state) 510, a step (or state) 512, a decision step (or state) 514, and a step (or state) 516.

The step 502 may start the method 500. Next, the method 500 may move to the decision step 504. In the decision step 504, the processors 106a-106n may determine whether the vehicle 50 is parked outdoors. Computer vision operations, and/or location information may be used to determine whether the vehicle 50 is in an outdoor environment. If the vehicle 50 is not parked outdoors, the method 500 may move to the step 506. The step 506 may end the method 500.

In the decision step 504, if the vehicle 50 is parked outdoors, the method 500 may move to the step 508. In the step 508, the capture devices 102a-102n may capture the video frames FRAMES_A-FRAMES_N of the outdoor environment. Next, in the step 510, the processors 106a-106n (e.g., the CNN module 150) may perform computer vision operations on the captured video frames. In the step 512, the decision module 512 may predict the state of the vehicle 50 based on results from the computer vision operations (and other information such as the sensors 114, the location information, the weather information, etc.). Next, the method 500 may move to the decision step 514.

In the decision step 514, the decision module 158 may determine whether the state of the vehicle predicted prevents driving. For example, the decision module 158 may determine whether there are factors present that prevent driving (e.g., for a cold climate the factors may comprise snow build-up, ice build-up, frost on windshield, inability for engine to start, etc.). If the state of the vehicle does not prevent driving, the method 500 may return to the step 508. If the state of the vehicle does prevent driving, the method 500 may move to the step 516. In the step 516, the processors 106a-106n may generate the signal VCRTL in order to initiate the application of the corrective measure(s) (e.g., performed by the actuators 116) based on the predicted state of the vehicle 50. The corrective measures may be applied to a specific component of the vehicle based on the objects detected in the video frames. For example, if the factor detected is frost on the windshield, the corrective measure may be applied to the windshield (e.g., the washer fluid 302a, the wipers 302b-302c, the heat 302d, etc.). Next, the method 500 may return to the step 508.

Figure 12:
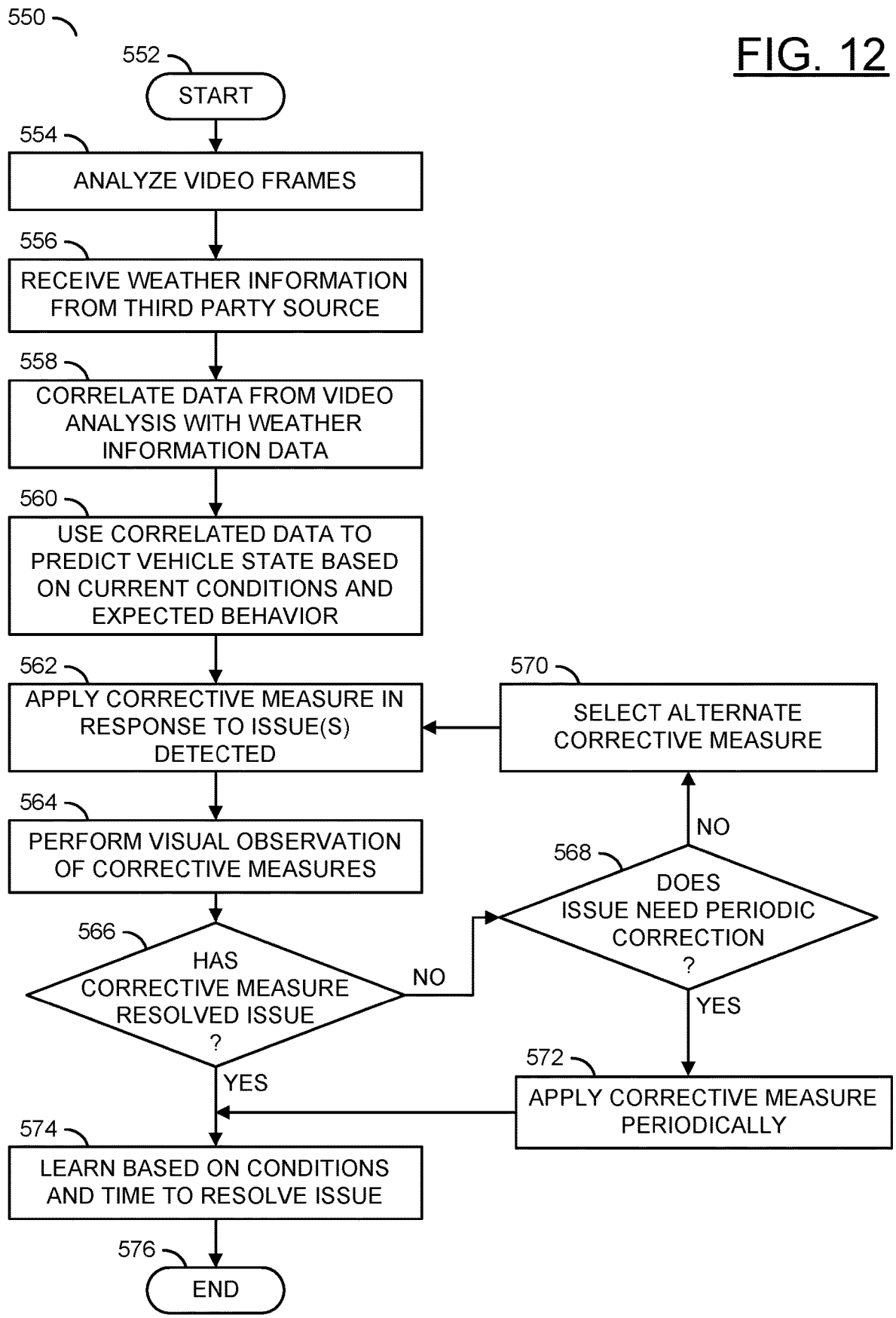
FIG. 12 is a flow diagram illustrating a method for predicting a vehicle state in response to third-party weather data and expected behavior.

Referring to FIG. 12, a method (or process) 550 is shown. The method 550 may predict a vehicle state in response to third-party weather data and expected behavior. The method 550 generally comprises a step (or state) 552, a step (or state) 554, a step (or state) 556, a step (or state) 558, a step (or state) 560, a step (or state) 562, a step (or state) 564, a decision step (or state) 566, a decision step (or state) 568, a step (or state) 570, a step (or state) 572, a step (or state) 574, and a step (or state) 576.

The step 552 may start the method 550. In the step 554, the processors 106a-106n may analyze the video frames FRAMES_A-FRAMES_N. Next, in the step 556, the wireless communication devices 110 may connect to the external user device 122 (e.g., via the signal LTE) to receive weather information from a third-party source (e.g., a weather network, a weather app, a meteorology resource, etc.). In the step 558, the sensor fusion module 152 may correlate the data from the video analysis with the weather information data. Next, the method 550 may move to the step 560.

In the step 560, the decision module 560 may use the correlated data to predict the state of the vehicle 50 based on the current conditions and expected behavior. Next, in the step 562, the processors 106a-106n may generate the signal VCTRL to apply the corrective measure in response to the issue(s) (e.g., factors) detected. In the step 564, the processors 106a-106n may perform visual observations of the corrective measures. In one example, the capture devices 102a-102n may capture video frames of the windshield as the wipers 302b-302c and the washer fluid 302a are applied to monitor and/or record the removal of detected frost. Next, the method 564 may move to the decision step 566.

In the decision step 566, the decision module 566 may determine whether the corrective measure(s) applied have resolved the issue (e.g., whether the vehicle 50 is drivable in response to the applied corrective measures). For example, the application of the corrective measures 302a-302n may be monitored using the computer vision analysis to determine whether the corrective measures have been effective and/or how long the corrective measures have taken to remove the issue(s). If the corrective measures have not resolved the issue(s), the method 550 may move to the decision step 568.

In the decision step 568, the decision module 158 may determine whether the issue needs periodic correction. For example, if snowfall is constant then the snow will build up on the windshield 60a after the initial snowfall has been removed by the wipers 302b-302c and the wipers 302b-302c may need to be applied again to deal with the continuing snowfall (e.g., activated once per minute). If the issue does not need periodic correction, the method 550 may move to the step 570. In the step 570, the decision module 158 may select an alternate one of the corrective measures 302a-302n. For example, if the wipers 302b-302c are not sufficient to deal with frost build-up on the windshield 60a, then an alternate corrective measure may be selected, such as the heat 302d. Next, the method 550 may return to the step 562.

In the decision step 568, if the issue does need periodic correction, then the method 550 may move to the step 572. In the step 572, the decision module 158 may determine how often to apply the corrective measure and apply the corrective measure periodically. Next, the method 550 may move to the step 574.

In the decision step 550, if the corrective measure has resolved the issue, the method 550 may move to the step 574. In the step 574, the processors 106a-106n may learn based on the conditions detected and the amount of time for the corrective measure to resolve the issue. The learning may be used to determine how effective the various corrective measures 302a-302n are. For example, if there is ice on the windshield 60a, then the processors 106a-106n may monitor how much time was taken to remove the ice (e.g., make the vehicle 50 drivable) using the windshield wipers only, the heat only, a combination of heat and wipers, a combination of washer fluid and heat, etc. The learning may take into account the amount of ice (e.g., wipers may be effective against a small amount of ice, but ineffective against thick ice). Next, the method 550 may move to the step 576. The step 576 may end the method 550.

Figure 13:
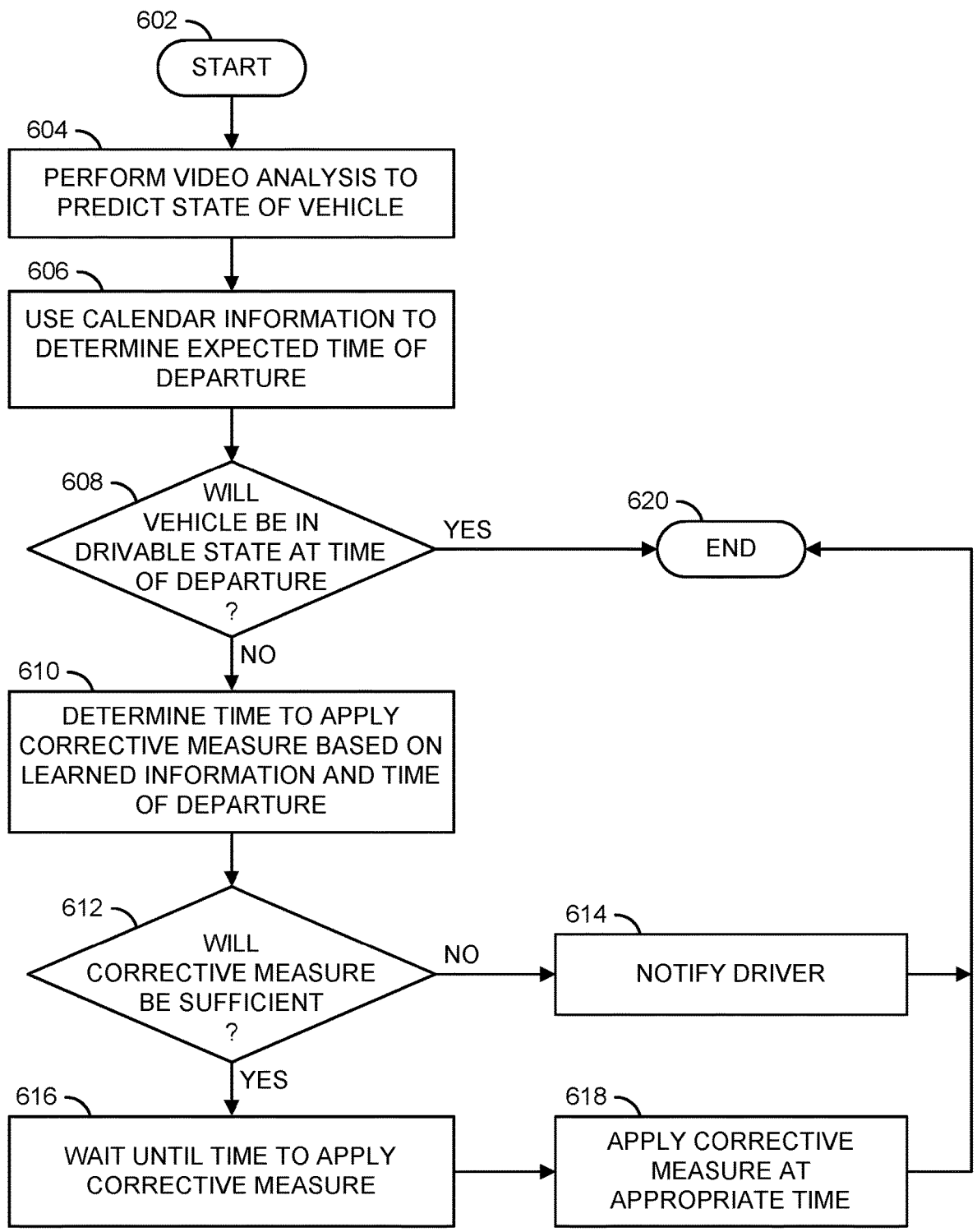
FIG. 13 is a flow diagram illustrating a method for applying a corrective measure in response to an expected departure time based on learned information.

Referring to FIG. 13, a method (or process) 600 is shown. The method 600 may apply a corrective measure in response to an expected departure time based on learned information. The method 600 generally comprises a step (or state) 602, a step (or state) 604, a step (or state) 606, a decision step (or state) 608, a step (or state) 610, a decision step (or state) 612, a step (or state) 614, a step (or state) 616, a step (or state) 618, and a step (or state) 620.

The step 602 may start the method 600. In the step 604, the processors 106a-106n may perform the video analysis to predict the state of the vehicle 50. Next, in the step 606, the sensor fusion module 152 may use calendar information to determine an expected time of departure of the driver 202. For example, the communication device 110 may receive the calendar information from the external user device 122 (e.g., information stored in a calendar/organizer app). In another example, the user data 174 may store information about the driver 202 such as the schedule data 452a and/or the behavior 452c. Next, the method 600 may move to the decision step 608.

In the decision step 608, the decision module 158 may determine whether the vehicle 50 will be drivable at the time of departure. For example, the decision module 158 may determine the predicted state of the vehicle 50 at the expected departure time to determine whether the vehicle 50 will be drivable. If the vehicle 50 will be drivable at the expected time of departure, the method 600 may move to the step 620. If the vehicle 50 will not be drivable at the expected time of departure, the method 600 may move to the step 610. In the step 610, the decision module 158 may determine the time to apply the corrective measure based on the learned information and the expected time of departure. For example, if the processors 106a-106n have learned that 10 minutes are needed to apply the heat 302d to remove the ice from the windshield 60a, then the decision module 158 may apply the corrective measure 302d at approximately 10 minutes before the expected time of departure. Next, the method 600 may move to the decision step 612.

In the decision step 612, the decision module 158 may determine whether the corrective measure will be sufficient to enable the vehicle 50 to be in a drivable state at the expected time of departure. For example, the decision module 158 may use the learned information about the effectiveness of the various corrective measures 302a-302n when applied to the particular detected factor. In one example, if the driver 202 is leaving in one hour and the corrective measure needs an hour and a half to correct the issue, then there may be insufficient time. In another example, if a factor is detected that cannot be corrected by the vehicle (e.g., the driveway is full of snow and the vehicle 50 is incapable of shoveling the snow), then the corrective measure may not be sufficient. If the corrective measure is not sufficient, then the method 600 may move to the step 614. In the step 614, the communication device 110 may notify the driver 202. For example, a text message may be sent to the external user device 122 to warn the driver 202 to leave earlier. Next, the method 600 may move to the step 620.

In the decision step 612, if the corrective measure is sufficient, then the processors 106a-106n may wait until the estimated correction time to apply the corrective measure. For example, if the corrective measure takes 5 minutes to resolve the issue, then the processors 106a-106n may wait until 5 minutes before the expected departure time to apply the corrective measure. Next, in the step 618, the processors 106a-106n may generate the signal VCTRL to apply the corrective measure(s) 302a-302n at the appropriate time. Next, the method 600 may move to the step 620. The step 620 may end the method 600.

Figure 14:
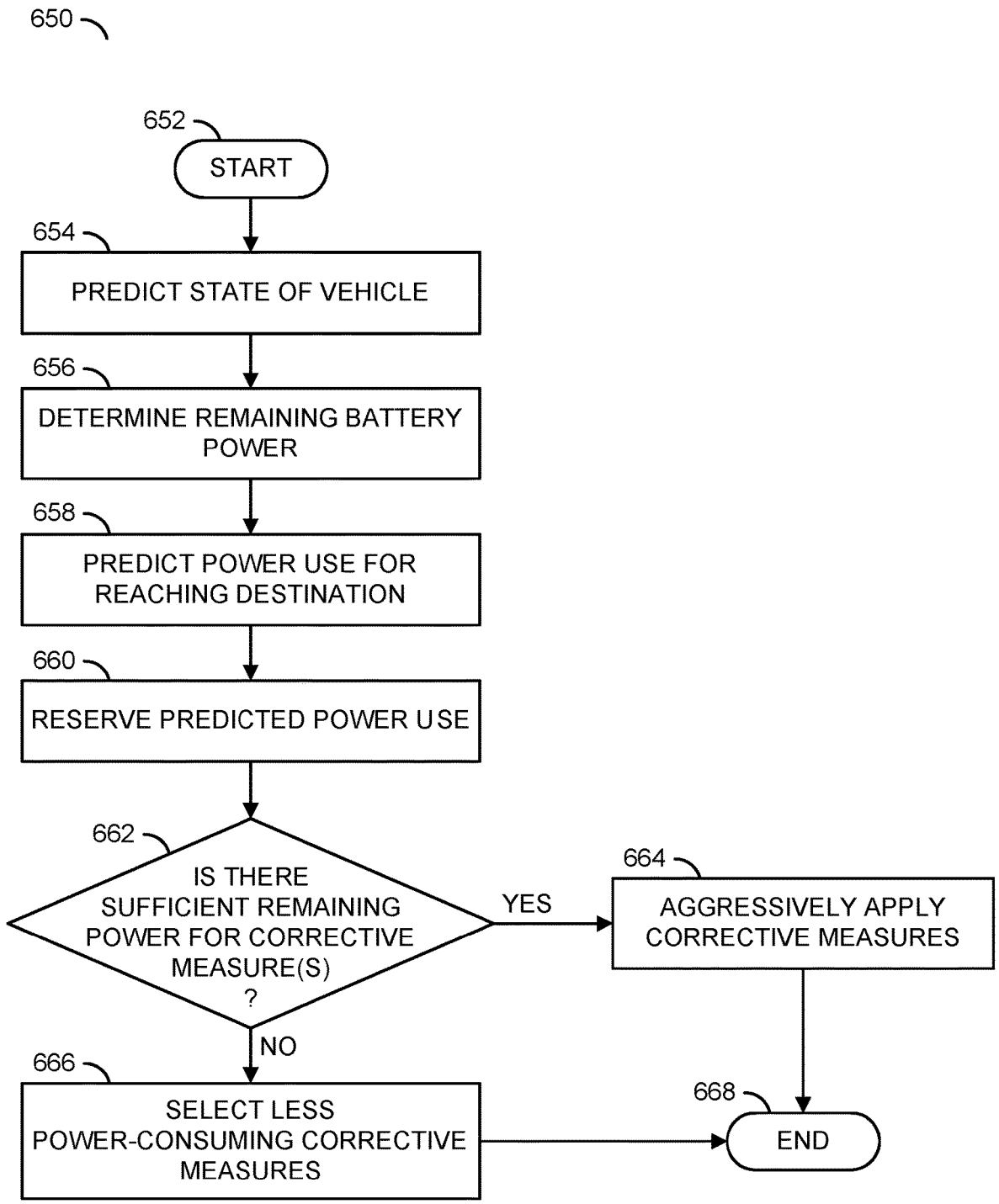
FIG. 14 is a flow diagram illustrating a method for selecting corrective measures based on an available battery supply.

Referring to FIG. 14, a method (or process) 650 is shown. The method 650 may select corrective measures based on an available battery supply. The method 650 generally comprises a step (or state) 652, a step (or state) 654, a step (or state) 656, a step (or state) 658, a step (or state) 660, a decision step (or state) 662, a step (or state) 664, a step (or state) 666, and a step (or state) 668.

The step 652 may start the method 650. In the step 654, the processors 106a-106n may predict the state of the parked vehicle 50. Next, in the step 656, the interface 104 may receive the signal BINFO to enable the processors 106a-106n to determine the remaining amount of power in the battery 120. In the step 658, the processors 106a-106n may predict the amount of power usage for reaching the destination (e.g., based on distance, driving behavior of the driver 202, weather conditions, power consumption rate of the vehicle 50, etc.). Next, in the step 660, the processors 106a-106n may reserve the predicted amount of power usage (e.g., to ensure that the vehicle 50 will be capable of reaching the future destination). Next, the method 650 may move to the decision step 662.

In the decision step 662, the processors 106a-106n may determine whether there is sufficient remaining power in the battery 120 for applying the corrective measures 302a-302n. If there is sufficient power, the method 650 may move to the step 664. In the step 664, the processors 106a-106n may aggressively apply the corrective measures 302a-302n to correct any potential factors that may prevent the vehicle 50 from being drivable. For example, the decision module 158 may select the most effective corrective measures without regard for the amount of power consumption. Next, the method 650 may move to the step 668.

In the decision step 662, if there is not sufficient remaining power for corrective measures, then the method 650 may move to the step 666. In the step 666, the decision module 158 may select less power-consuming corrective measures. For example, applying heat may be more effective at removing ice from the windshield 60a than the wipers 302b-302c, but heat may consume more power. To ensure that there is sufficient power to reach the destination, the wipers 302b-302c may be selected instead of the heat. For example, when there is potentially insufficient battery power, less effective corrective measures may be selected if they consume less power. Next, the method 650 may move to the step 668. The step 668 may end the method 650.

Figure 15:
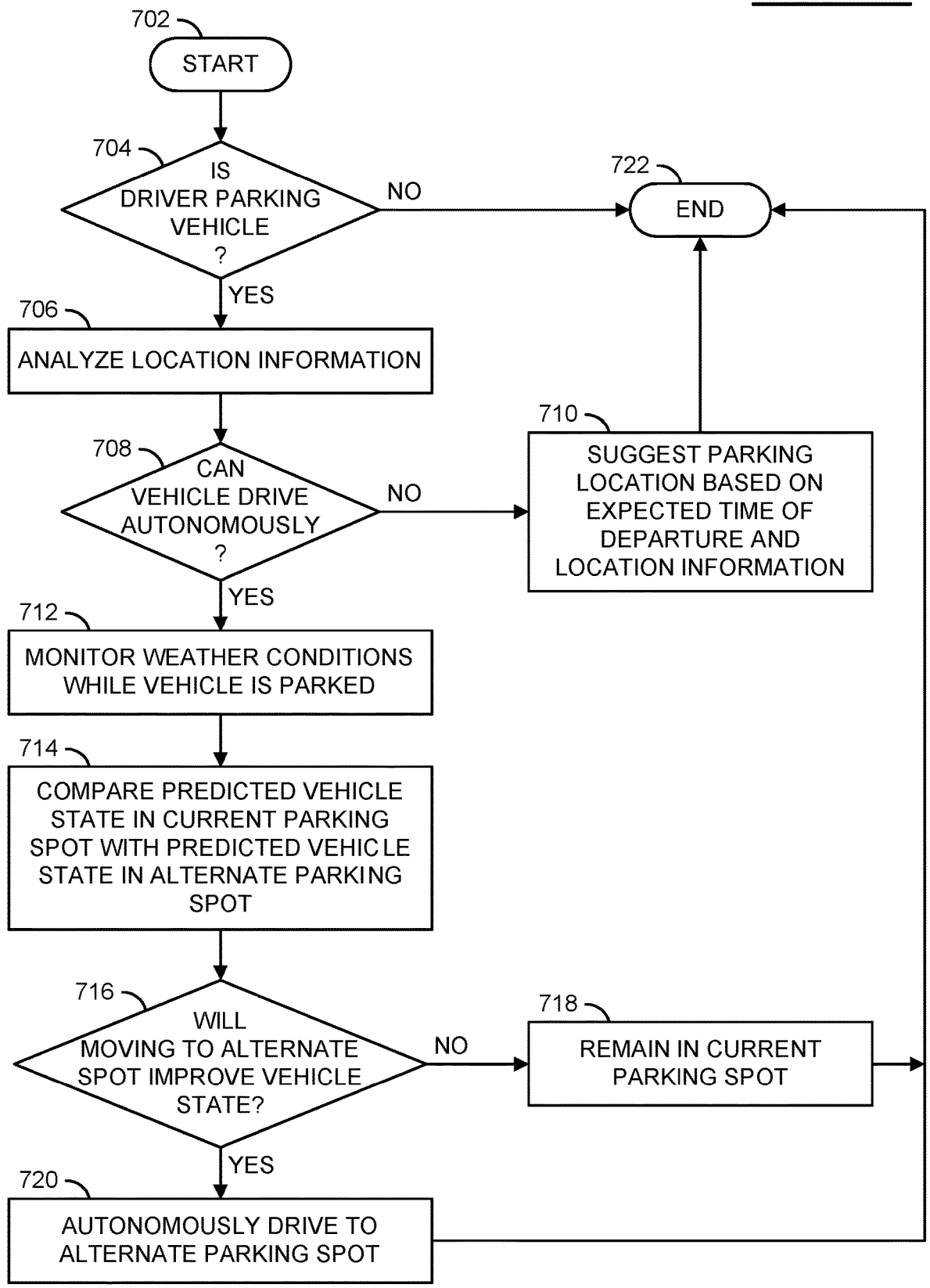
FIG. 15 is a flow diagram illustrating a method for using location information to select a parking location.

Referring to FIG. 15, a method (or process) 700 is shown. The method 700 may use location information to select a parking location. The method 700 generally comprises a step (or state) 702, a decision step (or state) 704, a step (or state) 706, a decision step (or state) 708, a step (or state) 710, a step (or state) 712, a step (or state) 714, a decision step (or state) 716, a step (or state) 718, a step (or state) 720, and a step (or state) 722.

The step 702 may start the method 700. Next, the method 700 may move to the decision step 704. In the decision step 704, the processors 106a-106n may determine whether the driver 202 is parking the vehicle. In one example, the sensors 114 may provide a GPS/GNSS destination that may be matched with a current GPS/GNSS coordinate. In another example, the sensors 114 may check a transmission status. In yet another example, the processors 106a-106n may perform video analysis to determine a location (e.g., a driveway, a parking lot, a parallel parking space, etc.). The method of determining whether the vehicle 50 is being parked may be varied according to the design criteria of a particular implementation. If the driver 202 is not parking the vehicle 50, the method 700 may move to the step 722. If the driver 202 is determined to be parking the vehicle 50, the method 700 may move to the step 706. In the step 706, the processors 106a-106n may analyze the location information (e.g., the location of sunlight at particular times of day, where shade sources are located, whether there is cover from buildings, etc.). Next, the method 700 may move to the decision step 708.

In the decision step 708, the processors 106a-106n may determine whether the vehicle 50 is configured to drive autonomously (e.g., drive without the presence of the driver 202 such as after the vehicle 50 is parked and the driver 202 has left). If the vehicle 50 cannot drive autonomously, the method 700 may move to the step 710. In the step 710, the decision module 158 may suggest parking location(s) based on the expected time of departure and the location information. For example, the processors 106a-106n may present an output to one or more of the displays 118a-118n (such as an infotainment unit) providing an indication of which parking spot to select. For example, the suggestion may indicate which parking spot(s) will be in the sunlight closer to when the driver 202 is expected to use the vehicle 50 again. Next, the method 700 may move to the step 722.

In the decision step 708, if the vehicle 50 can drive autonomously, the method 700 may move to the step 712. In the step 712, the processors 106a-106n may monitor the weather conditions while the vehicle 50 is parked. For example, the third party sources from the signal LTE may provide the weather conditions. In another example, the computer vision operations performed by the processors 106a-106n may monitor the outdoor environment near the vehicle 50. Next, in the step 714, the processors 106a-106n may compare the predicted vehicle state in the current parking spot (e.g., the parking spot 430a) with the predicted vehicle state in an alternate parking spot (e.g., the parking spot 430b). For example, if the alternate parking spot is in the sunlit area 426, the sunlight may help remove some of the factors that may prevent the vehicle 50 from being drivable and/or use less power to address the issues (e.g., sunlight may naturally de-frost the windows instead of using heat and/or wasting washer fluid). Next, the method 700 may move to the decision step 716.

In the decision step 716, the processors 106a-106n may determine whether moving to the alternate spot will improve the state of the vehicle 50 (e.g., at the expected time of departure). For example, whether the vehicle state may be improved may be based on the weather conditions (e.g., a shady spot may be preferred in warm weather and sunny parking spot may be preferred in cold weather). If moving to the alternate parking spot may not improve the state of the vehicle 50, then the method 700 may move to the step 718. In the step 718, the vehicle 50 may remain in the current parking spot. Next, the method 700 may move to the step 722. In the decision step 716, if moving to the alternate parking spot may improve the state of the vehicle 50, then the method 700 may move to the step 720. In the step 720, the vehicle 50 may autonomously drive to the alternate parking spot. Next, the method 700 may move to the step 722. The step 722 may end the method 700.

The functions performed by the diagrams of FIGS. 1-15 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive (i) pixel data comprising at least one of (a) a vehicle or (b) an outdoor environment near said vehicle and (ii) a correction signal; and
a processor configured to (i) process said pixel data arranged as video frames, (ii) perform video operations on said video frames to detect objects, (iii) predict a state of said vehicle based on said objects detected in said video frames, (iv) generate said correction signal and (v) determine a visual confirmation in response to said correction signal and said video frames, wherein (a) said correction signal is configured to apply a corrective measure based on said predicted state of said vehicle, (b) said state of said vehicle comprises factors that prevent driving said vehicle, (c) said visual confirmation compares said state of said vehicle before said correction signal and after said correction signal to (i) monitor a result for whether said factors that prevent driving said vehicle have been corrected by said corrective measure and (ii) determine an amount of time for said result to enable said state of said vehicle to be drivable with respect to detected weather conditions, (d) training data is generated for estimating said result in said detected weather conditions using said amount of time, said corrective measure and said state of said vehicle and (e) said training data is used by a convolutional neural network to predict said state of said vehicle accurately.

2. The apparatus according to claim 1, wherein (i) said processor is further configured to contribute said training data to fleet learning for estimating said result in said detected weather conditions using said amount of time, said corrective measure and said state of said vehicle and (ii) said fleet learning comprises using said training data captured from multiple vehicles.

3. The apparatus according to claim 1, wherein said training data comprises video frames generated before said corrective measure, said video frames generated during said corrective measure and said video frames generated after said corrective measure.

4. The apparatus according to claim 1, wherein said corrective measure is applied in response to an expected departure time of a driver.

5. The apparatus according to claim 4, wherein said corrective measure is only applied for an estimated correction time before said expected departure time.

6. The apparatus according to claim 4, wherein said expected departure time is determined based on a manual input from said driver, learning behavior of said driver and a combination of said manual input and said behavior.

7. The apparatus according to claim 4, further configured to connect to a device wirelessly, wherein said processor is further configured to determine said expected departure time based on calendar information for said driver received from said device.

8. The apparatus according to claim 7, wherein said processor is further configured to generate a notification for said device when said processor determines that said corrective measure is unable to change said state of said vehicle before said expected departure time.

9. The apparatus according to claim 1, wherein said state of said vehicle comprises at least one of an amount of snow build-up, visibility through windows, visibility of mirrors or frozen doors.

10. The apparatus according to claim 1, wherein said corrective measure is applied to a specific component of said vehicle based on said objects detected in said video frames.

11. The apparatus according to claim 1, wherein said corrective measure is applied when a threshold for one of said factors is met.

12. The apparatus according to claim 1, wherein (i) said corrective measure is applied in response to a user setting and (ii) said user setting provides options for maintaining a drivability of said vehicle and surroundings of said vehicle.

13. The apparatus according to claim 1, wherein said corrective measure comprises one or more of activating windshield wipers, activating a windshield de-frost, applying washer fluid, or heating said vehicle.

14. The apparatus according to claim 1, further configured to connect to a device wirelessly, wherein said processor is further configured to (i) receive weather information from said device and (ii) combine said weather information with said objects detected in said video frames to predict said state of said vehicle.

15. The apparatus according to claim 14, wherein said processor is further configured to analyze said video frames and correlate said objects with said weather information to predict said state of said vehicle.

16. The apparatus according to claim 1, wherein (i) said processor is further configured to monitor an amount of energy in a battery of said vehicle and (ii) said processor is further configured to balance conserving said energy and selecting said corrective measure.

17. The apparatus according to claim 1, wherein (i) said processor is further configured to receive location information about an area, (ii) suggest a parking location for said vehicle based on said location information and (iii) said parking location is suggested to mitigate said factors.

18. The apparatus according to claim 1, wherein (i) said vehicle is an autonomous vehicle, (ii) said processor is further configured to receive location information about an area and (iii) said correction signal causes said vehicle to drive autonomously to an alternate parking location to mitigate said factors.

19. An apparatus comprising:
   an interface configured to receive (i) pixel data comprising at least one of (a) a vehicle or (b) an outdoor environment near said vehicle and (ii) a correction signal; and
   a processor configured to (i) process said pixel data arranged as video frames, (ii) perform video operations on said video frames to detect objects, (iii) predict a state of said vehicle based on said objects detected in said video frames, (iv) generate said correction signal, (v) determine a visual confirmation in response to said correction signal and said video frames and (vi) determine a battery status of said vehicle, wherein (a) said correction signal is configured to apply a corrective measure based on (i) said predicted state of said vehicle and (ii) said battery status, (b) said state of said vehicle comprises factors that prevent driving said vehicle, (c) said visual confirmation compares said state of said vehicle before said correction signal and after said correction signal to (i) monitor a result for whether said factors that prevent driving said vehicle have been corrected by said corrective measure and (ii) determine an amount of time for said result to enable said state of said vehicle to be drivable with respect to detected weather conditions and (d) said correction signal selects said corrective measure with a higher power consumption when said battery status indicates said vehicle will not run out of energy and said corrective measure with a lower power consumption when said battery status indicates said vehicle will run out of said energy with said corrective measure having said higher power consumption.

20. The apparatus according to claim 19, wherein said processor is further configured to (i) predict an expected driving range for said vehicle based on a schedule of a driver, (ii) determine an amount of said energy consumed from a battery of said vehicle for said expected driving range and (iii) and select said corrective measure to ensure said amount of said energy for said expected driving range is available after applying said corrective measure.

\* \* \* \* \*